(12) United States Patent
Tao et al.

(10) Patent No.: US 8,659,816 B2
(45) Date of Patent: Feb. 25, 2014

(54) MECHANICAL LAYER AND METHODS OF MAKING THE SAME

(75) Inventors: Yi Tao, San Jose, CA (US); Hojin Lee, Seoul (KR); Fan Zhong, Fremont, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 259 days.

(21) Appl. No.: 13/093,716

(22) Filed: Apr. 25, 2011

(65) Prior Publication Data

US 2012/0268430 A1 Oct. 25, 2012

(51) Int. Cl.
*G02B 26/00* (2006.01)
*G09G 3/34* (2006.01)

(52) U.S. Cl.
USPC ............ 359/290; 359/223.1; 359/224.1; 359/224.2; 359/291; 359/292; 359/295; 359/298; 359/315; 359/318; 345/85; 345/108; 348/770; 348/771

(58) Field of Classification Search
USPC ............ 359/290–292, 295, 298, 315, 318, 359/223.1, 224.1, 224.2
See application file for complete search history.

(56) References Cited

U.S. PATENT DOCUMENTS

| | | |
|---|---|---|
| 2,590,906 A | 4/1952 | Tripp |
| 2,677,714 A | 5/1954 | Auwarter |
| 3,037,189 A | 5/1962 | Barrett et al. |
| 3,210,757 A | 10/1965 | Jacob |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |

(Continued)

FOREIGN PATENT DOCUMENTS

| | | |
|---|---|---|
| CH | 680534 | 9/1992 |
| CN | 092109265 | 11/2003 |

(Continued)

OTHER PUBLICATIONS

Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.

(Continued)

*Primary Examiner* — Evelyn A. Lester
(74) *Attorney, Agent, or Firm* — Knobbe, Martens, Olson & Bear LLP

(57) ABSTRACT

This disclosure provides mechanical layers and methods of forming the same. In one aspect, a method of forming a pixel includes depositing a black mask on a substrate, depositing an optical stack over the black mask, and forming a mechanical layer over the optical stack. The black mask is disposed along at least a portion of a side of the pixel, and the mechanical layer defines a cavity between the mechanical layer and the optical stack. The mechanical layer includes a reflective layer, a dielectric layer, and a cap layer, and the dielectric layer is disposed between the reflective layer and the cap layer. The method further includes forming a notch in the dielectric layer of the mechanical layer along the side of the pixel so as to reduce the overlap of the dielectric layer with the black mask along the side of the pixel.

31 Claims, 17 Drawing Sheets

(56) References Cited

U.S. PATENT DOCUMENTS

| | | |
|---|---|---|
| 3,955,880 A | 5/1976 | Lierke |
| 4,377,324 A | 3/1983 | Durand et al. |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,482,213 A | 11/1984 | Piliavin et al. |
| 4,497,974 A | 2/1985 | Deckman et al. |
| 4,498,953 A | 2/1985 | Cook et al. |
| 4,500,171 A | 2/1985 | Penz et al. |
| 4,519,676 A | 5/1985 | Te Velde |
| 4,560,435 A | 12/1985 | Brown et al. |
| 4,566,935 A | 1/1986 | Hornbeck |
| 4,655,554 A | 4/1987 | Armitage |
| 4,705,361 A | 11/1987 | Frazier et al. |
| 4,710,732 A | 12/1987 | Hornbeck |
| 4,779,959 A | 10/1988 | Saunders |
| 4,786,128 A | 11/1988 | Birnbach |
| 4,790,635 A | 12/1988 | Apsley |
| 4,822,993 A | 4/1989 | Dillon et al. |
| 4,852,516 A | 8/1989 | Rubin et al. |
| 4,859,060 A | 8/1989 | Katagiri et al. |
| 4,900,136 A | 2/1990 | Goldburt et al. |
| 4,900,395 A | 2/1990 | Syverson et al. |
| 4,925,259 A | 5/1990 | Emmett |
| 4,954,789 A | 9/1990 | Sampsell |
| 4,956,619 A | 9/1990 | Hornbeck |
| 4,965,562 A | 10/1990 | Verhulst |
| 4,973,131 A | 11/1990 | Carnes |
| 4,982,184 A | 1/1991 | Kirkwood |
| 5,002,631 A | 3/1991 | Giapis et al. |
| 5,022,745 A | 6/1991 | Zahowski et al. |
| 5,028,939 A | 7/1991 | Hornbeck et al. |
| 5,044,736 A | 9/1991 | Jaskie et al. |
| 5,062,689 A | 11/1991 | Koehler |
| 5,075,796 A | 12/1991 | Schildkraut et al. |
| 5,083,364 A | 1/1992 | Olbrich et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,168,406 A | 12/1992 | Nelson |
| 5,170,283 A | 12/1992 | O'Brien et al. |
| 5,172,262 A | 12/1992 | Hornbeck |
| 5,192,395 A | 3/1993 | Boysel et al. |
| 5,212,582 A | 5/1993 | Nelson |
| 5,216,537 A | 6/1993 | Hornbeck |
| 5,226,099 A | 7/1993 | Mignardi et al. |
| 5,231,532 A | 7/1993 | Magel et al. |
| 5,233,456 A | 8/1993 | Nelson |
| 5,287,215 A | 2/1994 | Warde et al. |
| 5,293,272 A | 3/1994 | Jannson et al. |
| 5,311,360 A | 5/1994 | Bloom et al. |
| 5,312,512 A | 5/1994 | Allman et al. |
| 5,315,370 A | 5/1994 | Bulow |
| 5,324,683 A | 6/1994 | Fitch et al. |
| 5,334,250 A | 8/1994 | Mikami et al. |
| 5,345,328 A | 9/1994 | Fritz et al. |
| 5,347,377 A | 9/1994 | Revelli, Jr. et al. |
| 5,381,232 A | 1/1995 | Van Wijk |
| 5,452,138 A | 9/1995 | Mignardi et al. |
| 5,454,906 A | 10/1995 | Baker et al. |
| 5,471,341 A | 11/1995 | Warde et al. |
| 5,489,952 A | 2/1996 | Gove et al. |
| 5,497,262 A | 3/1996 | Kaeriyama |
| 5,499,037 A | 3/1996 | Nakagawa et al. |
| 5,500,761 A | 3/1996 | Goossen et al. |
| 5,526,172 A | 6/1996 | Kanack |
| 5,535,047 A | 7/1996 | Hornbeck |
| 5,536,359 A | 7/1996 | Kawada et al. |
| 5,550,373 A | 8/1996 | Cole et al. |
| 5,552,924 A | 9/1996 | Tregilgas |
| 5,559,358 A | 9/1996 | Burns et al. |
| 5,561,523 A | 10/1996 | Blomberg et al. |
| 5,578,976 A | 11/1996 | Yao |
| 5,583,688 A | 12/1996 | Hornbeck |
| 5,597,736 A | 1/1997 | Sampsell |
| 5,600,383 A | 2/1997 | Hornbeck |
| 5,606,441 A | 2/1997 | Florence et al. |
| 5,608,468 A | 3/1997 | Gove et al. |
| 5,619,059 A | 4/1997 | Li et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,629,794 A * | 5/1997 | Magel et al. ................. 359/290 |
| 5,631,782 A | 5/1997 | Smith et al. |
| 5,636,052 A | 6/1997 | Arney et al. |
| 5,638,946 A | 6/1997 | Zavracky |
| 5,646,729 A | 7/1997 | Koskinen et al. |
| 5,646,768 A | 7/1997 | Kaeiyama |
| 5,650,881 A | 7/1997 | Hornbeck |
| 5,661,592 A | 8/1997 | Bornstein et al. |
| 5,665,997 A | 9/1997 | Weaver et al. |
| 5,673,139 A | 9/1997 | Johnson |
| 5,686,979 A | 11/1997 | Weber et al. |
| 5,690,839 A | 11/1997 | Min |
| 5,699,181 A | 12/1997 | Choi |
| 5,710,656 A | 1/1998 | Goossen |
| 5,719,068 A | 2/1998 | Suzawa et al. |
| 5,726,480 A | 3/1998 | Pister |
| 5,734,177 A | 3/1998 | Sakamoto |
| 5,739,945 A | 4/1998 | Tayebati |
| 5,745,281 A | 4/1998 | Yi et al. |
| 5,751,469 A | 5/1998 | Arney et al. |
| 5,771,116 A | 6/1998 | Miller et al. |
| 5,771,321 A | 6/1998 | Stern |
| 5,773,088 A | 6/1998 | Bhat |
| 5,783,864 A | 7/1998 | Dawson et al. |
| 5,784,189 A | 7/1998 | Bozler et al. |
| 5,784,212 A | 7/1998 | Hornbeck |
| 5,785,877 A | 7/1998 | Sato et al. |
| 5,786,927 A | 7/1998 | Greywall et al. |
| 5,808,781 A | 9/1998 | Arney et al. |
| 5,815,141 A | 9/1998 | Phares |
| 5,818,095 A | 10/1998 | Sampsell |
| 5,822,110 A | 10/1998 | Dabbaj |
| 5,825,528 A | 10/1998 | Goossen |
| 5,835,255 A | 11/1998 | Miles |
| 5,838,484 A | 11/1998 | Goossen et al. |
| 5,867,302 A | 2/1999 | Fleming |
| 5,870,221 A | 2/1999 | Goossen |
| 5,896,796 A | 4/1999 | Chih |
| 5,905,482 A | 5/1999 | Hughes et al. |
| 5,906,536 A | 5/1999 | Imazato et al. |
| 5,914,803 A | 6/1999 | Hwang et al. |
| 5,914,804 A | 6/1999 | Goossen |
| 5,920,418 A | 7/1999 | Shiono et al. |
| 5,920,421 A | 7/1999 | Choi |
| 5,933,183 A | 8/1999 | Enomoto et al. |
| 5,940,684 A | 8/1999 | Shakuda et al. |
| 5,943,155 A | 8/1999 | Goossen |
| 5,943,158 A | 8/1999 | Ford et al. |
| 5,959,763 A | 9/1999 | Bozler et al. |
| 5,961,848 A | 10/1999 | Jacquet et al. |
| 5,967,163 A | 10/1999 | Pan et al. |
| 5,972,193 A | 10/1999 | Chou et al. |
| 5,978,127 A | 11/1999 | Berg |
| 5,986,796 A | 11/1999 | Miles |
| 5,998,293 A | 12/1999 | Dawson et al. |
| 6,028,689 A | 2/2000 | Michalicek et al. |
| 6,028,690 A | 2/2000 | Carter et al. |
| 6,031,653 A | 2/2000 | Wang |
| 6,038,056 A | 3/2000 | Florence et al. |
| 6,040,937 A | 3/2000 | Miles |
| 6,046,659 A | 4/2000 | Loo et al. |
| 6,055,090 A | 4/2000 | Miles |
| 6,097,145 A | 8/2000 | Kastalsky et al. |
| 6,100,477 A | 8/2000 | Randall et al. |
| 6,100,861 A | 8/2000 | Cohen et al. |
| 6,104,525 A | 8/2000 | Min |
| 6,124,851 A | 9/2000 | Jacobsen |
| 6,137,182 A | 10/2000 | Hause et al. |
| 6,165,890 A | 12/2000 | Kohl et al. |

(56) References Cited

U.S. PATENT DOCUMENTS

| | | |
|---|---|---|
| 6,170,332 B1 | 1/2001 | MacDonald et al. |
| 6,201,633 B1 | 3/2001 | Peeters et al. |
| 6,204,080 B1 | 3/2001 | Hwang |
| 6,215,221 B1 | 4/2001 | Cabuz et al. |
| 6,242,932 B1 | 6/2001 | Hembree |
| 6,249,039 B1 | 6/2001 | Harvey et al. |
| 6,262,697 B1 | 7/2001 | Stephenson |
| 6,282,010 B1 | 8/2001 | Sulzbach et al. |
| 6,284,560 B1 | 9/2001 | Jech, Jr. et al. |
| 6,285,424 B1 | 9/2001 | Yoshida |
| 6,288,472 B1 | 9/2001 | Cabuz et al. |
| 6,288,824 B1 | 9/2001 | Kastalsky |
| 6,295,154 B1 | 9/2001 | Laor et al. |
| 6,297,072 B1 | 10/2001 | Tilmans et al. |
| 6,301,000 B1 | 10/2001 | Johnson |
| 6,323,987 B1 | 11/2001 | Rinaudo et al. |
| 6,324,192 B1 | 11/2001 | Tayebati |
| 6,327,071 B1 | 12/2001 | Kimura |
| 6,335,224 B1 | 1/2002 | Peterson et al. |
| 6,335,235 B1 | 1/2002 | Bhekta et al. |
| 6,339,417 B1 | 1/2002 | Quanrud |
| 6,351,329 B1 | 2/2002 | Greywall |
| 6,356,378 B1 | 3/2002 | Huibers |
| 6,358,021 B1 | 3/2002 | Cabuz |
| 6,359,673 B1 | 3/2002 | Stephenson |
| 6,377,233 B2 | 4/2002 | Colgan et al. |
| 6,381,022 B1 | 4/2002 | Zavracky |
| 6,384,952 B1 | 5/2002 | Clark et al. |
| 6,391,675 B1 | 5/2002 | Ehmke et al. |
| 6,400,738 B1 | 6/2002 | Tucker et al. |
| 6,407,851 B1 | 6/2002 | Islam et al. |
| 6,409,876 B1 | 6/2002 | McQuarrie et al. |
| 6,417,868 B1 | 7/2002 | Bock |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,447,126 B1 | 9/2002 | Hornbeck |
| 6,448,622 B1 | 9/2002 | Franke et al. |
| 6,449,084 B1 | 9/2002 | Guo |
| 6,452,712 B2 | 9/2002 | Atobe et al. |
| 6,465,355 B1 | 10/2002 | Horsley |
| 6,466,354 B1 | 10/2002 | Gudeman |
| 6,473,072 B1 | 10/2002 | Comiskey et al. |
| 6,513,911 B1 | 2/2003 | Ozaki et al. |
| 6,519,073 B1 | 2/2003 | Goossen |
| 6,522,801 B1 | 2/2003 | Aksyuk et al. |
| 6,537,427 B1 | 3/2003 | Raina |
| 6,556,338 B2 | 4/2003 | Han et al. |
| 6,558,506 B1 | 5/2003 | Freeman et al. |
| 6,574,033 B1 | 6/2003 | Chui et al. |
| 6,577,785 B1 | 6/2003 | Spahn et al. |
| 6,597,490 B2 | 7/2003 | Tayebati |
| 6,602,791 B2 | 8/2003 | Ouellet et al. |
| 6,608,268 B1 | 8/2003 | Goldsmith |
| 6,618,187 B2 | 9/2003 | Pilossof |
| 6,625,047 B2 | 9/2003 | Coleman, Jr. |
| 6,632,698 B2 | 10/2003 | Ives |
| 6,635,919 B1 | 10/2003 | Melendez et al. |
| 6,642,913 B1 | 11/2003 | Kimura et al. |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,090 B1 | 1/2004 | Chua et al. |
| 6,674,562 B1 | 1/2004 | Miles et al. |
| 6,677,225 B1 | 1/2004 | Ellis et al. |
| 6,680,792 B2 | 1/2004 | Miles |
| 6,696,096 B2 | 2/2004 | Tsubaki et al. |
| 6,698,295 B1 | 3/2004 | Sherrer |
| 6,704,475 B2 | 3/2004 | Jin et al. |
| 6,707,594 B2 | 3/2004 | Holmes |
| 6,710,908 B2 | 3/2004 | Miles et al. |
| 6,713,235 B1 | 3/2004 | Ide et al. |
| 6,720,267 B1 | 4/2004 | Chen et al. |
| 6,736,987 B1 | 5/2004 | Cho |
| 6,738,194 B1 | 5/2004 | Ramirez et al. |
| 6,747,800 B1 | 6/2004 | Lin |
| 6,756,317 B2 | 6/2004 | Sniegowski et al. |
| 6,760,146 B2 | 7/2004 | Ikeda et al. |
| 6,768,555 B2 | 7/2004 | Chen et al. |
| 6,778,306 B2 | 8/2004 | Sniegowski et al. |
| 6,778,728 B2 | 8/2004 | Taylor et al. |
| 6,782,166 B1 | 8/2004 | Grote et al. |
| 6,788,175 B1 | 9/2004 | Prophet |
| 6,794,119 B2 | 9/2004 | Miles |
| 6,803,534 B1 | 10/2004 | Chen et al. |
| 6,806,110 B2 | 10/2004 | Lester et al. |
| 6,812,482 B2 | 11/2004 | Fleming et al. |
| 6,813,059 B2 | 11/2004 | Hunter et al. |
| 6,822,780 B1 | 11/2004 | Long |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,859,301 B1 | 2/2005 | Islam et al. |
| 6,861,277 B1 | 3/2005 | Monroe et al. |
| 6,862,127 B1 | 3/2005 | Ishii |
| 6,867,896 B2 | 3/2005 | Miles |
| 6,870,654 B2 | 3/2005 | Lin et al. |
| 6,881,535 B2 | 4/2005 | Yamaguchi |
| 6,882,458 B2 | 4/2005 | Lin et al. |
| 6,882,461 B1 | 4/2005 | Tsai et al. |
| 6,906,849 B1 | 6/2005 | Mi et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,951,824 B2 | 10/2005 | Fischer et al. |
| 6,952,303 B2 | 10/2005 | Lin et al. |
| 6,953,702 B2 | 10/2005 | Miller et al. |
| 6,958,847 B2 | 10/2005 | Lin |
| 6,960,305 B2 | 11/2005 | Doan et al. |
| 6,967,757 B1 | 11/2005 | Allen et al. |
| 6,972,891 B2 | 12/2005 | Patel et al. |
| 6,980,350 B2 | 12/2005 | Hung et al. |
| 6,982,820 B2 | 1/2006 | Tsai |
| 6,983,820 B2 | 1/2006 | Boast et al. |
| 6,987,432 B2 | 1/2006 | Lutz et al. |
| 6,991,995 B2 | 1/2006 | Aulnette et al. |
| 6,999,225 B2 | 2/2006 | Lin et al. |
| 7,002,726 B2 | 2/2006 | Patel et al. |
| 7,006,272 B2 | 2/2006 | Tsai |
| 7,008,812 B1 | 3/2006 | Carley |
| 7,009,754 B2 | 3/2006 | Huibers |
| 7,012,726 B1 | 3/2006 | Miles |
| 7,016,099 B2 | 3/2006 | Ikeda et al. |
| 7,027,202 B1 | 4/2006 | Hunter et al. |
| 7,027,204 B2 | 4/2006 | Trisnadi et al. |
| 7,034,981 B2 | 4/2006 | Makigaki |
| 7,041,224 B2 | 5/2006 | Patel et al. |
| 7,041,571 B2 | 5/2006 | Strane |
| 7,042,619 B1 | 5/2006 | McGinley et al. |
| 7,046,422 B2 | 5/2006 | Kimura et al. |
| 7,049,164 B2 | 5/2006 | Bruner |
| 7,050,219 B2 | 5/2006 | Kimura |
| 7,064,089 B2 | 6/2006 | Yamazaki et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,161,728 B2 | 1/2007 | Sampsell et al. |
| 7,161,730 B2 | 1/2007 | Floyd |
| 7,184,195 B2 | 2/2007 | Yang |
| 7,184,202 B2 | 2/2007 | Miles et al. |
| 7,198,973 B2 | 4/2007 | Lin et al. |
| 7,205,722 B2 | 4/2007 | Koshio et al. |
| 7,221,495 B2 | 5/2007 | Miles et al. |
| 7,233,029 B2 | 6/2007 | Mochizuki |
| 7,236,284 B2 | 6/2007 | Miles |
| 7,245,285 B2 | 7/2007 | Yeh et al. |
| 7,250,315 B2 | 7/2007 | Miles |
| 7,250,930 B2 | 7/2007 | Hoffman et al. |
| 7,256,107 B2 | 8/2007 | Takeuchi et al. |

(56) References Cited

U.S. PATENT DOCUMENTS

| | | |
|---|---|---|
| 7,289,259 B2 | 10/2007 | Chui et al. |
| 7,302,157 B2 | 11/2007 | Chui |
| 7,304,784 B2 | 12/2007 | Chui et al. |
| 7,321,456 B2 | 1/2008 | Cummings |
| 7,321,457 B2 | 1/2008 | Heald |
| 7,327,510 B2 | 2/2008 | Cummings et al. |
| 7,339,170 B2 | 3/2008 | Deliwala |
| 7,358,103 B2 | 4/2008 | Li et al. |
| 7,372,613 B2 | 5/2008 | Chui et al. |
| 7,372,619 B2 | 5/2008 | Miles |
| 7,382,515 B2 | 6/2008 | Chung et al. |
| 7,385,744 B2 | 6/2008 | Kogut et al. |
| 7,385,762 B2 | 6/2008 | Cummings |
| 7,399,710 B2 | 7/2008 | Launay |
| 7,400,488 B2 | 7/2008 | Lynch et al. |
| 7,405,852 B2 | 7/2008 | Brosnihan et al. |
| 7,417,746 B2 | 8/2008 | Lin et al. |
| 7,417,783 B2 | 8/2008 | Chui et al. |
| 7,417,784 B2 | 8/2008 | Sasagawa et al. |
| 7,420,725 B2 | 9/2008 | Kothari |
| 7,420,728 B2 | 9/2008 | Tung et al. |
| 7,429,334 B2 | 9/2008 | Tung et al. |
| 7,436,573 B2 | 10/2008 | Doan et al. |
| 7,459,402 B2 | 12/2008 | Doan et al. |
| 7,460,291 B2 | 12/2008 | Sampsell et al. |
| 7,460,292 B2 | 12/2008 | Chou |
| 7,471,442 B2 | 12/2008 | Sampsell |
| 7,476,327 B2 | 1/2009 | Tung et al. |
| 7,477,440 B1 | 1/2009 | Huang et al. |
| 7,485,236 B2 | 2/2009 | Lin |
| 7,486,867 B2 | 2/2009 | Wang |
| 7,492,503 B2 | 2/2009 | Chui |
| 7,508,566 B2 | 3/2009 | Feenstra et al. |
| 7,515,327 B2 | 4/2009 | Cummings |
| 7,527,995 B2 | 5/2009 | Sampsell |
| 7,527,998 B2 | 5/2009 | Tung et al. |
| 7,532,377 B2 | 5/2009 | Miles |
| 7,532,381 B2 | 5/2009 | Miles et al. |
| 7,532,386 B2 | 5/2009 | Cummings |
| 7,535,621 B2 | 5/2009 | Chiang |
| 7,542,198 B2 | 6/2009 | Kothari |
| 7,545,552 B2 | 6/2009 | U'Ren |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,556,917 B2 | 7/2009 | Miles |
| 7,561,321 B2 | 7/2009 | Heald |
| 7,564,612 B2 | 7/2009 | Chui |
| 7,564,613 B2 | 7/2009 | Sasagawa et al. |
| 7,566,664 B2 | 7/2009 | Yan et al. |
| 7,566,940 B2 | 7/2009 | Sasagawa et al. |
| 7,567,373 B2 | 7/2009 | Chui et al. |
| 7,569,488 B2 | 8/2009 | Rafanan |
| 7,612,932 B2 | 11/2009 | Chui et al. |
| 7,612,933 B2 | 11/2009 | Djordjev |
| 7,616,369 B2 | 11/2009 | Miles et al. |
| 7,623,287 B2 | 11/2009 | Sasagawa et al. |
| 7,625,825 B2 | 12/2009 | Chan |
| 7,629,197 B2 | 12/2009 | Luo et al. |
| 7,630,114 B2 | 12/2009 | Wang et al. |
| 7,630,119 B2 | 12/2009 | Tung et al. |
| 7,630,121 B2 | 12/2009 | Endisch et al. |
| 7,642,110 B2 | 1/2010 | Miles |
| 7,643,199 B2 | 1/2010 | Lan |
| 7,643,202 B2 | 1/2010 | Sasagawa |
| 7,649,671 B2 | 1/2010 | Kothari et al. |
| 7,660,031 B2 | 2/2010 | Floyd |
| 7,663,794 B2 | 2/2010 | Cummings |
| 7,672,035 B2 | 3/2010 | Sampsell et al. |
| 7,679,812 B2 | 3/2010 | Sasagawa et al. |
| 7,684,104 B2 | 3/2010 | Chui et al. |
| 7,692,844 B2 | 4/2010 | Miles |
| 7,704,772 B2 | 4/2010 | Tung et al. |
| 7,704,773 B2 | 4/2010 | Kogut et al. |
| 7,706,042 B2 | 4/2010 | Chung et al. |
| 7,709,964 B2 | 5/2010 | Lin |
| 7,711,239 B2 | 5/2010 | Sasagawa et al. |
| 7,715,079 B2 | 5/2010 | Kogut et al. |
| 7,715,085 B2 | 5/2010 | Sasagawa |
| 7,719,500 B2 | 5/2010 | Chui |
| 7,719,752 B2 | 5/2010 | Sampsell et al. |
| 7,723,015 B2 | 5/2010 | Miles |
| 7,738,157 B2 | 6/2010 | Miles |
| 7,742,220 B2 | 6/2010 | Kogut et al. |
| 7,746,539 B2 | 6/2010 | Sampsell |
| 7,747,109 B2 | 6/2010 | Zhong et al. |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,808,694 B2 | 10/2010 | Miles |
| 7,808,695 B2 | 10/2010 | Sampsell |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell |
| 7,852,545 B2 | 12/2010 | Miles |
| 7,855,826 B2 | 12/2010 | de Groot |
| 7,859,740 B2 | 12/2010 | Tung |
| 7,872,792 B2 | 1/2011 | Miles |
| 7,875,485 B2 | 1/2011 | Sasagawa et al. |
| RE42,119 E | 2/2011 | Chui et al. |
| 7,884,989 B2 | 2/2011 | Gally et al. |
| 7,889,415 B2 | 2/2011 | Kothari |
| 7,889,417 B2 | 2/2011 | Sasagawa |
| 7,893,919 B2 | 2/2011 | Kothari et al. |
| 7,898,722 B2 | 3/2011 | Miles |
| 7,898,723 B2 | 3/2011 | Khazeni et al. |
| 7,898,725 B2 | 3/2011 | Sampsell |
| 7,924,494 B2 | 4/2011 | Tung et al. |
| 7,932,728 B2 | 4/2011 | Chou et al. |
| 7,936,031 B2 | 5/2011 | Sampsell et al. |
| 7,936,497 B2 | 5/2011 | Chui et al. |
| 7,944,599 B2 | 5/2011 | Chui et al. |
| 7,944,604 B2 | 5/2011 | Ganti et al. |
| 7,948,671 B2 | 5/2011 | Tung et al. |
| 7,952,787 B2 | 5/2011 | Tung et al. |
| 8,064,124 B2 | 11/2011 | Chung et al. |
| 8,111,262 B2 | 2/2012 | Djordjev et al. |
| 2001/0003487 A1 | 6/2001 | Miles |
| 2001/0010953 A1 | 8/2001 | Kang et al. |
| 2001/0026951 A1 | 10/2001 | Vergani et al. |
| 2001/0028503 A1 | 10/2001 | Flanders et al. |
| 2001/0040675 A1 | 11/2001 | True et al. |
| 2001/0043171 A1 | 11/2001 | Van Gorkom et al. |
| 2001/0044165 A1 | 11/2001 | Lee et al. |
| 2001/0055208 A1 | 12/2001 | Kimura |
| 2002/0014579 A1 | 2/2002 | Dunfield |
| 2002/0027636 A1 | 3/2002 | Yamada |
| 2002/0031155 A1 | 3/2002 | Tayebati et al. |
| 2002/0033229 A1 | 3/2002 | Lebouitz et al. |
| 2002/0045362 A1 | 4/2002 | Yang et al. |
| 2002/0051281 A1 | 5/2002 | Ueda et al. |
| 2002/0054422 A1 | 5/2002 | Carr et al. |
| 2002/0054424 A1 | 5/2002 | Miles |
| 2002/0055253 A1 | 5/2002 | Rudhard |
| 2002/0058422 A1 | 5/2002 | Jang et al. |
| 2002/0070931 A1 | 6/2002 | Ishikawa |
| 2002/0071169 A1 | 6/2002 | Bowers et al. |
| 2002/0075555 A1 | 6/2002 | Miles |
| 2002/0086455 A1 | 7/2002 | Franosch et al. |
| 2002/0109899 A1 | 8/2002 | Ohtaka et al. |
| 2002/0110948 A1 | 8/2002 | Huang et al. |
| 2002/0117728 A1 | 8/2002 | Brosnihan et al. |
| 2002/0126364 A1 | 9/2002 | Miles |
| 2002/0131682 A1 | 9/2002 | Nasiri et al. |

(56) References Cited

U.S. PATENT DOCUMENTS

| | | |
|---|---|---|
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154422 A1 | 10/2002 | Sniegowski et al. |
| 2002/0168136 A1 | 11/2002 | Atia et al. |
| 2002/0186209 A1 | 12/2002 | Cok |
| 2002/0186483 A1 | 12/2002 | Hagelin et al. |
| 2002/0195681 A1 | 12/2002 | Melendez et al. |
| 2002/0197761 A1 | 12/2002 | Patel et al. |
| 2003/0006468 A1 | 1/2003 | Ma et al. |
| 2003/0011864 A1 | 1/2003 | Flanders |
| 2003/0015936 A1 | 1/2003 | Yoon et al. |
| 2003/0016428 A1 | 1/2003 | Kato et al. |
| 2003/0035196 A1 | 2/2003 | Walker |
| 2003/0036215 A1 | 2/2003 | Reid |
| 2003/0043157 A1 | 3/2003 | Miles |
| 2003/0053078 A1 | 3/2003 | Missey et al. |
| 2003/0053233 A1 | 3/2003 | Felton |
| 2003/0091072 A1 | 5/2003 | Wang et al. |
| 2003/0112096 A1 | 6/2003 | Potter |
| 2003/0119221 A1 | 6/2003 | Cunningham et al. |
| 2003/0121609 A1 | 7/2003 | Ohmi et al. |
| 2003/0123125 A1 | 7/2003 | Little |
| 2003/0123126 A1 | 7/2003 | Meyer et al. |
| 2003/0138213 A1 | 7/2003 | Jin et al. |
| 2003/0138669 A1 | 7/2003 | Kojima et al. |
| 2003/0164350 A1 | 9/2003 | Hanson et al. |
| 2003/0173504 A1 | 9/2003 | Cole et al. |
| 2003/0201784 A1 | 10/2003 | Potter |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2003/0231373 A1 | 12/2003 | Kowarz et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0028849 A1 | 2/2004 | Stark et al. |
| 2004/0038513 A1 | 2/2004 | Kohl et al. |
| 2004/0043552 A1 | 3/2004 | Strumpell et al. |
| 2004/0053434 A1 | 3/2004 | Bruner |
| 2004/0056742 A1 | 3/2004 | Dabbaj |
| 2004/0066477 A1 | 4/2004 | Morimoto et al. |
| 2004/0070813 A1 | 4/2004 | Aubuchon |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0080807 A1 | 4/2004 | Chen et al. |
| 2004/0080832 A1 | 4/2004 | Singh |
| 2004/0100594 A1 | 5/2004 | Huibers et al. |
| 2004/0100677 A1 | 5/2004 | Huibers et al. |
| 2004/0124073 A1 | 7/2004 | Pillans et al. |
| 2004/0124483 A1 | 7/2004 | Partridge et al. |
| 2004/0124495 A1 | 7/2004 | Chen et al. |
| 2004/0125281 A1 | 7/2004 | Lin et al. |
| 2004/0125347 A1 | 7/2004 | Patel et al. |
| 2004/0136045 A1 | 7/2004 | Tran |
| 2004/0136076 A1 | 7/2004 | Tayebati |
| 2004/0145811 A1 | 7/2004 | Lin et al. |
| 2004/0147198 A1 | 7/2004 | Lin et al. |
| 2004/0150869 A1 | 8/2004 | Kasai |
| 2004/0174583 A1 | 9/2004 | Chen et al. |
| 2004/0175577 A1 | 9/2004 | Lin et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0197526 A1 | 10/2004 | Mehta |
| 2004/0201908 A1 | 10/2004 | Kaneko |
| 2004/0207497 A1 | 10/2004 | Hsu et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0218251 A1 | 11/2004 | Piehl et al. |
| 2004/0226909 A1 | 11/2004 | Tzeng et al. |
| 2004/0233498 A1 | 11/2004 | Starkweather et al. |
| 2004/0233553 A1 | 11/2004 | Shibata et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0020089 A1 | 1/2005 | Shi et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0069209 A1 | 3/2005 | Damera-Vankata et al. |
| 2005/0078348 A1 | 4/2005 | Lin |
| 2005/0098840 A1 | 5/2005 | Fuertsch et al. |
| 2005/0117190 A1 | 6/2005 | Iwauchi et al. |
| 2005/0117623 A1 | 6/2005 | Shchukin et al. |
| 2005/0118832 A1 | 6/2005 | Korzenski et al. |
| 2005/0122294 A1 | 6/2005 | Ben-David et al. |
| 2005/0128543 A1 | 6/2005 | Phillips et al. |
| 2005/0128565 A1 | 6/2005 | Ljungblad |
| 2005/0133761 A1 | 6/2005 | Thielemans |
| 2005/0168849 A1 | 8/2005 | Lin |
| 2005/0170670 A1 | 8/2005 | King et al. |
| 2005/0179378 A1 | 8/2005 | Oooka et al. |
| 2005/0195462 A1 | 9/2005 | Lin |
| 2005/0195464 A1 | 9/2005 | Faase et al. |
| 2005/0231793 A1 | 10/2005 | Sato |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0018348 A1 | 1/2006 | Przybyla et al. |
| 2006/0024620 A1 | 2/2006 | Nikkel et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066511 A1 | 3/2006 | Chui |
| 2006/0066641 A1 | 3/2006 | Gally et al. |
| 2006/0066926 A1 | 3/2006 | Kwak et al. |
| 2006/0066932 A1 | 3/2006 | Chui et al. |
| 2006/0067650 A1 | 3/2006 | Chui |
| 2006/0077155 A1 | 4/2006 | Chui et al. |
| 2006/0077509 A1 | 4/2006 | Tung et al. |
| 2006/0082588 A1 | 4/2006 | Mizuno et al. |
| 2006/0082863 A1 | 4/2006 | Piehl et al. |
| 2006/0096705 A1 | 5/2006 | Shi et al. |
| 2006/0119922 A1 | 6/2006 | Faase et al. |
| 2006/0132927 A1 | 6/2006 | Yoon |
| 2006/0171628 A1 | 8/2006 | Naniwada |
| 2006/0180886 A1 | 8/2006 | Tsang |
| 2006/0197413 A9 | 9/2006 | Takeuchi et al. |
| 2006/0203325 A1 | 9/2006 | Faase et al. |
| 2006/0220160 A1 | 10/2006 | Miles |
| 2006/0266730 A1 | 11/2006 | Doan et al. |
| 2007/0020948 A1 | 1/2007 | Piehl et al. |
| 2007/0064760 A1 | 3/2007 | Kragh |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0111533 A1 | 5/2007 | Korzenski et al. |
| 2007/0138608 A1 | 6/2007 | Ikehashi |
| 2007/0153860 A1 | 7/2007 | Chang-Hasnain et al. |
| 2007/0205969 A1 | 9/2007 | Hagood et al. |
| 2007/0216987 A1 | 9/2007 | Hagood et al. |
| 2007/0249078 A1 | 10/2007 | Tung et al. |
| 2007/0253054 A1 | 11/2007 | Miles |
| 2007/0268211 A1 | 11/2007 | Whitehead et al. |
| 2007/0279730 A1 | 12/2007 | Heald |
| 2007/0279753 A1 | 12/2007 | Tung et al. |
| 2007/0285761 A1 | 12/2007 | Zhong et al. |
| 2008/0002299 A1 | 1/2008 | Thurn |
| 2008/0030657 A1 | 2/2008 | Wu et al. |
| 2008/0041817 A1 | 2/2008 | Lin |
| 2008/0055706 A1 | 3/2008 | Chui et al. |

(56) References Cited

U.S. PATENT DOCUMENTS

| | | |
|---|---|---|
| 2008/0068697 A1 | 3/2008 | Haluzak et al. |
| 2008/0068781 A1 | 3/2008 | Kim |
| 2008/0080043 A1 | 4/2008 | Chui et al. |
| 2008/0088910 A1 | 4/2008 | Miles |
| 2008/0100899 A1 | 5/2008 | Shimokawa et al. |
| 2008/0110855 A1 | 5/2008 | Cummings |
| 2008/0151353 A1 | 6/2008 | Haskett |
| 2008/0158645 A1 | 7/2008 | Chiang |
| 2008/0180783 A1 | 7/2008 | Wang et al. |
| 2008/0186581 A1 | 8/2008 | Bita et al. |
| 2008/0297880 A1 | 12/2008 | Steckl et al. |
| 2008/0314866 A1 | 12/2008 | Chui et al. |
| 2009/0009444 A1 | 1/2009 | Heald et al. |
| 2009/0021884 A1 | 1/2009 | Nakamura |
| 2009/0078316 A1 | 3/2009 | Khazeni |
| 2009/0086306 A1 | 4/2009 | Kothari et al. |
| 2009/0101192 A1 | 4/2009 | Kothari et al. |
| 2009/0103166 A1 | 4/2009 | Khazeni et al. |
| 2009/0122384 A1 | 5/2009 | Felnhofer et al. |
| 2009/0126777 A1 | 5/2009 | Khazeni et al. |
| 2009/0159123 A1 | 6/2009 | Kothari |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0231496 A1 | 9/2009 | Nishino et al. |
| 2009/0231666 A1 | 9/2009 | Gudlavalleti et al. |
| 2009/0256218 A1 | 10/2009 | Mignard et al. |
| 2009/0257105 A1 | 10/2009 | Xu et al. |
| 2009/0279162 A1 | 11/2009 | Chui |
| 2009/0293955 A1 | 12/2009 | Kothari et al. |
| 2009/0323153 A1 | 12/2009 | Sampsell |
| 2009/0323168 A1 | 12/2009 | Miles et al. |
| 2010/0014148 A1 | 1/2010 | Djordjev |
| 2010/0044808 A1 | 2/2010 | Dekker et al. |
| 2010/0051089 A1 | 3/2010 | Khazeni et al. |
| 2010/0053148 A1 | 3/2010 | Khazeni et al. |
| 2010/0096006 A1 | 4/2010 | Griffiths |
| 2010/0096011 A1 | 4/2010 | Griffiths |
| 2010/0118382 A1 | 5/2010 | Kothari et al. |
| 2010/0147790 A1 | 6/2010 | Sasagawa et al. |
| 2010/0149627 A1 | 6/2010 | Sasagawa et al. |
| 2010/0182675 A1 | 7/2010 | Sampsell et al. |
| 2010/0202039 A1 | 8/2010 | Kogut et al. |
| 2010/0236624 A1 | 9/2010 | Khazeni et al. |
| 2010/0238572 A1 | 9/2010 | Tao et al. |
| 2010/0309572 A1 | 12/2010 | Mignard |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0044496 A1 | 2/2011 | Chui et al. |
| 2011/0063712 A1 | 3/2011 | Kothari et al. |
| 2011/0069371 A1 | 3/2011 | Kothari et al. |
| 2011/0075241 A1 | 3/2011 | Mienko et al. |
| 2011/0075245 A1 | 3/2011 | Hashimura et al. |
| 2011/0080632 A1 | 4/2011 | Miles |
| 2011/0090554 A1 | 4/2011 | Tung |
| 2011/0116156 A1 | 5/2011 | Kothari |
| 2011/0134505 A1 | 6/2011 | Sasagawa |
| 2011/0169724 A1 | 7/2011 | Tao et al. |
| 2011/0170166 A1 | 7/2011 | Miles |
| 2011/0170167 A1 | 7/2011 | Miles |
| 2011/0170168 A1 | 7/2011 | Endisch et al. |
| 2011/0188109 A1 | 8/2011 | Chui et al. |
| 2011/0188110 A1 | 8/2011 | Miles |
| 2011/0194169 A1 | 8/2011 | Ganti et al. |
| 2012/0013218 A1 | 1/2012 | Huang |
| 2012/0062978 A1* | 3/2012 | De Smet et al. ............... 359/290 |

FOREIGN PATENT DOCUMENTS

| | | |
|---|---|---|
| CN | 1641398 A | 7/2005 |
| DE | 19938072 | 3/2000 |
| DE | 19847455 | 4/2000 |
| DE | 10228946 A1 | 1/2004 |
| DE | 10 2006 039 071 | 2/2008 |
| EP | 0069226 A2 | 1/1983 |
| EP | 0 035 299 | 9/1983 |
| EP | 0 361 981 | 4/1990 |
| EP | 0 668 490 | 8/1995 |
| EP | 0 695 959 | 2/1996 |
| EP | 0 758 080 | 2/1997 |
| EP | 0788005 A2 | 8/1997 |
| EP | 0 879 991 | 11/1998 |
| EP | 0878824 A2 | 11/1998 |
| EP | 0 969 306 | 1/2000 |
| EP | 0 986 077 | 3/2000 |
| EP | 1 122 577 | 8/2001 |
| EP | 1170618 A2 | 1/2002 |
| EP | 1197778 A2 | 4/2002 |
| EP | 1 205 782 | 5/2002 |
| EP | 1209738 A2 | 5/2002 |
| EP | 1 227 346 | 7/2002 |
| EP | 1 275 997 | 1/2003 |
| EP | 1 403 212 | 3/2004 |
| EP | 1 439 515 | 7/2004 |
| EP | 1452481 A2 | 9/2004 |
| EP | 1 473 581 | 11/2004 |
| EP | 1484635 A1 | 12/2004 |
| EP | 1 928 028 | 6/2008 |
| FR | 2824643 A1 | 11/2002 |
| JP | 49004993 | 1/1974 |
| JP | 56-088111 | 7/1981 |
| JP | 5-49238 | 2/1993 |
| JP | 5-281479 | 10/1993 |
| JP | 5275401 A | 10/1993 |
| JP | 06301054 | 10/1994 |
| JP | 08-051230 | 2/1996 |
| JP | 08293580 | 11/1996 |
| JP | 9127439 | 5/1997 |
| JP | 10148644 | 6/1998 |
| JP | 11-211999 | 8/1999 |
| JP | 11097799 | 9/1999 |
| JP | 2000 147262 | 5/2000 |
| JP | 2001085519 | 3/2001 |
| JP | 2001-221913 | 8/2001 |
| JP | 2001 249283 | 9/2001 |
| JP | 2002-062490 | 2/2002 |
| JP | 2002207182 | 7/2002 |
| JP | 2002-221678 | 8/2002 |
| JP | 2002243937 | 8/2002 |
| JP | 2002277767 A | 9/2002 |
| JP | 2002277771 A | 9/2002 |
| JP | 2002287047 A | 10/2002 |
| JP | 2002328313 A | 11/2002 |
| JP | 2002341267 A | 11/2002 |
| JP | 2003001598 | 1/2003 |
| JP | 2003021798 | 1/2003 |
| JP | 2003-340795 | 2/2003 |
| JP | 2003 177336 | 6/2003 |
| JP | 2003215475 | 7/2003 |
| JP | 2003-315732 | 11/2003 |
| JP | 2004-012642 | 1/2004 |
| JP | 2004106074 | 4/2004 |
| JP | 2004133281 | 4/2004 |
| JP | 2004141995 A | 5/2004 |
| JP | 2004157527 A | 6/2004 |
| JP | 2004-212638 | 7/2004 |
| JP | 2004-212680 | 7/2004 |
| JP | 2004212656 | 7/2004 |
| JP | 2005 279831 | 10/2005 |
| JP | 2005-308871 | 11/2005 |
| JP | 2006043778 A | 2/2006 |
| JP | 2007 027150 | 2/2007 |
| KR | 2002-010322 | 2/2002 |
| WO | 9105284 | 4/1991 |
| WO | 9210925 | 6/1992 |
| WO | WO 98/14804 | 4/1998 |
| WO | WO 98/43129 | 10/1998 |
| WO | 0114248 A2 | 3/2001 |
| WO | WO 01/53113 | 7/2001 |
| WO | 0156919 A2 | 8/2001 |
| WO | 0163657 | 8/2001 |

(56) References Cited

FOREIGN PATENT DOCUMENTS

| WO | WO 02/24570 | 3/2002 |
|---|---|---|
| WO | 0238491 A1 | 5/2002 |
| WO | WO 02/063602 | 8/2002 |
| WO | WO 02/071132 | 9/2002 |
| WO | 0279853 A1 | 10/2002 |
| WO | WO 02/086582 | 10/2002 |
| WO | 03014789 A2 | 2/2003 |
| WO | 2004000717 | 12/2003 |
| WO | WO 03/105198 | 12/2003 |
| WO | 2004015741 A2 | 2/2004 |
| WO | WO 2004/042687 | 5/2004 |
| WO | 2004055885 A2 | 7/2004 |
| WO | 2004079056 A2 | 9/2004 |
| WO | 2005006364 A1 | 1/2005 |
| WO | WO 2005/010566 | 2/2005 |
| WO | 2005061378 A2 | 7/2005 |
| WO | WO 2006/035698 | 4/2006 |
| WO | 2006073111 A1 | 7/2006 |
| WO | 2007014022 | 2/2007 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |

OTHER PUBLICATIONS

Cacharelis et al., 1997, A Reflective-mode PDLC Light Valve Display Technology, Proceedings of European Solid State Device Research Conference (ESSDERC), pp. 596-599.

Dokmeci et al., Dec. 2004, Two-axis single-crystal silicon micromirror arrays, Journal of Microelectromechanical Systems, 13(6):1006-1017.

Maier et al., 1996, 1.3" active matrix liquid crystal spatial light modulator with 508 dpi resolution, SPIE vol. 2754, pp. 171-179.

Pape et al., Characteristics of the deformable mirror device for optical information processing, Optical Engineering, 22(6):676-681, Nov.-Dec. 1983.

Qualcomm MEMS Technologies, Inc., May 2008, Interferometric Modulator (IMOD) Technology Overview, White Paper, 14 pp.

Taii et al., A transparent sheet display by plastic MEMS, Journal of the SID 14(8):735-741, 2006.

Tolansky, 1948, Chapter II: Multiple-Beam Interference, in Multiple-bean Interferometry of Surfaces and Films, Oxford at the Clarendon Press, pp. 8-11.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

Billard, Tunable Capacitor, 5th Annual Review of LETI, Jun. 24, 2003, p. 7.

Conner, Hybrid Color Display Using Optical Interference Filter Array, SID Digest, pp. 577-580 (1993).

Feenstra et al., Electrowetting displays, Liquavista BV, 16 pp., Jan. 2006.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l Conf. on Solid State Sensors and Actuators, Jun. 24, 1991, pp. 372-375.

Kowarz at al., Conformal grating electromechanical system (GEMS) for high-speed digital light modulation, Proceedings of the IEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

Londergan et al., Advanced processes for MEMS-based displays, Proceedings of the Asia Display 2007, SID, 1:107-112.

Longhurst, 1963, Chapter IX: Multiple Beam Interferometry, in Geometrical and Physical Optics, pp. 153-157.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, 4985:131-139, 2003.

Nakagawa et al., Feb. 1, 2002, Wide-field-of-view narrow-band spectral filters based on photonic crystal nanocavities, Optics Letters, 27(3):191-193.

Nieminen et al., 2004, Design of a temperature-stable RF MEM capacitor, IEEE Journal of Microelectromechanical Systems, 13(5):705-714.

ISR and WO dated Jul. 26, 2012 in PCT/US12/034276.

Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.

Aratani K. et al., "Surface Micromachined Tuneable Interferometer Array," Sensors and Actuators A,Elsevier Sequoia S.A., Lausanne, CH, A, 1993, 43(1/3), 17-23.

Chiou, et al., "A Novel Capacitance Control Design of Tunable Capacitor using Multiple Electrostatic Driving Electrodes," IEEE Nanoelectronics and Giga-Scale Systems, 2001, 319-324.

Dai, et al., "A CMOS Surface Micromachined Pressure Sensor," Journal of the Chinese Institute of Engineers, 1999, vol. 22(3), 375-380.

Dai, et al., "A Maskless Post-CMOS Bulk Micromachining Process and Its Application," Journal of Micromechanics and Microengineering, Dec. 2005, 15(12), 2366-2371.

Fan, et al., "Channel Drop Filters in Photonic Crystals," Optics Express, 1998, vol. 3(1), pp. 4-11.

Fork, et al., "P-67 Chip on Glass Bonding using Stressed Metal TM Technology," SID 05 Digest, 2005, 534-537.

Goossen K.W. et al., "Possible Display Applications of the Silicon Mechanical Antireflection Switch," Society for Information Display, 1994.

Ibbotson, et al., "Comparison of $XeF_2$ and F-atom Reactions with Si and $SiO_2$," Applied Physics Letters, 1984, 44(12), 1129-1131.

Joannopoulos, et al., "Photonic Crystals Molding the Flow of Light," Princeton University Press, 1995.

Lee, et al., "Improvement of the Surface Characteristics of Sputtered Metal Layer for a Mems Micro-Mirror Switch," Thin solid films, 2004, vol. 447, 615-618.

Magel G.A., "Integrated Optic Devices using Micromachined Metal Membranes," SPIE, 1996, vol. 2686, 54-63.

Penta Vacuum MEMS Etcher Specifications, http://www.pentavacuum.com/memes.htm, Jan. 5, 2005.

Raley, et al., "A Fabry-Perot Microinterferometer for Visible Wavelengths," IEEE Solid-State Sensor and Actuator Workshop, 1992, 170-173.

Sridharan, et al., "Post-Packaging Release a New Concept for Surface-Micromachined Devices," Technical Digest, IEEE Solid-State Sensor & Actuator Workshop, 1998, 225-228.

Wang, et al., "Flexible Circuit-Based RF MEMS Switches," Proceedings of 2001 ASME International Mechanical Engineering Congress and Exposition, Nov. 11-16 2001 pp. 757-762.

Williams, et al., "Etch Rates for Micromachining Processing," Journal of Microelectromechanical Systems, 1996, vol. 5(4), 256-269.

Winters, et al., "The Etching of Silicon with XeF2 Vapor," Applied Physics Letters, 1979, vol. 34(1), 70-73.

Yao et al., "BrF3 Dry Release Technology for Large Free Standing Parylene Micro Structures and Electrostatic Actuators," Sensors and Actuators A, 2002, vol. 97-98, 771-775.

* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

MECHANICAL LAYER AND METHODS OF MAKING THE SAME

TECHNICAL FIELD

This disclosure relates to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

During manufacture of interferometric devices, a sacrificial layer can be used to determine a gap height between the reflective membrane and the stationary layer. However, upon removal of the sacrificial layer, residual mechanical stresses can cause the reflective membrane to bend or contort. The residual mechanical stresses can come from a variety of sources, such as edges in the reflective membrane arising from topological variation in structures underlying the reflective membrane. There is a need for interferometric devices having improved mirror flatness. Additionally, there is a need for interferometric devices having improved dark state and/or improved switching speed.

SUMMARY

The systems, methods and devices of the disclosure each have several innovative aspects, no single one of which is solely responsible for the desirable attributes disclosed herein.

One innovative aspect of the subject matter disclosed in this disclosure can be implemented in an apparatus that includes a substrate and a plurality of pixels arranged in an array on the substrate. Each pixel includes a black mask disposed on the substrate along at least a portion of a side of each pixel, an optical stack disposed over the substrate and over at least a portion of the black mask, and a mechanical layer disposed over the optical stack. The mechanical layer includes a reflective layer, a cap layer, and a dielectric layer disposed between the reflective layer and the cap layer. Each pixel further includes a cavity between the mechanical layer and the optical stack, and the mechanical layer is movable through the cavity between an actuated position and a relaxed position. The mechanical layer includes a notch in the dielectric layer along the side of each pixel, and the notch reduces the overlap of the dielectric layer with the black mask along the side of the pixel.

In some implementations, the reflective layer and the cap layer extend past a portion of the dielectric layer and electrically contact each other in at least a portion of the notch.

In some implementations, the notch in the mechanical layer extends through each of the reflective layer, the dielectric layer, and the cap layer along the side of each pixel.

In some implementations, the notch has a length dimension extending along the side of the pixel of between about 2 µm and about 30 µm. In some implementations, the notch has a width dimension extending from an edge of the mechanical layer into the mechanical layer of between about 0.5 µm and about 5 µm.

Another innovative aspect of the subject matter disclosed in this disclosure can be implemented in a method of forming an electromechanical device having a plurality of pixels. The method includes depositing a black mask on a substrate, the black mask disposed along at least a portion of a side of each pixel. The method further includes depositing an optical stack over the substrate and over at least a portion of the black mask and forming a mechanical layer over the optical stack. Forming the mechanical layer includes providing a reflective layer, a dielectric layer over the reflective layer, and a cap layer over the supporting layer. The method further includes forming a cavity between the mechanical layer and the optical stack, the mechanical layer movable through the cavity between an actuated position and a relaxed position. The method further includes forming a notch in the dielectric layer of the mechanical layer along the side of each pixel, the notch reducing the overlap of the dielectric layer with the black mask along the side of the pixel.

In some implementations, the method further includes forming a notch in the cap and reflective layers of the mechanical layer along the side of each pixel.

In some implementations, the reflective layer and the cap layer are formed to extend past a portion of the dielectric layer and electrically contact each other in at least a portion of the notch.

Another innovative aspect of the subject matter disclosed in this disclosure can be implemented in an apparatus including a substrate and a plurality of pixels arranged in an array on the substrate. Each pixel includes a means for absorbing light on the substrate, the light absorbing means including a portion disposed along a side of each pixel. Each pixel further includes an optical stack disposed over the substrate and over at least a portion of the light absorbing means and a mechanical layer disposed over the optical stack. The mechanical layer includes a reflective layer, a dielectric layer, and a cap layer, and the dielectric layer is disposed between the reflective layer and the cap layer. Each pixel further includes a cavity between the mechanical layer and the optical stack. The mechanical layer is movable through the cavity between an actuated position and a relaxed position. The mechanical layer further includes a means for reducing overlap along the side of each pixel, the overlap reducing means reducing the overlap of the dielectric layer with the light absorbing means along the side of the pixel.

In some implementations, the overlap reducing means is further configured to reduce the overlap of the reflective and cap layers with the light absorbing means.

In some implementations, the reflective layer and the cap layer extend past the dielectric layer and electrically contact each other in at least a portion of the overlap reducing means.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements, which may have certain structural or characteristic differences according to certain implementations.

DETAILED DESCRIPTION

Figure 1:
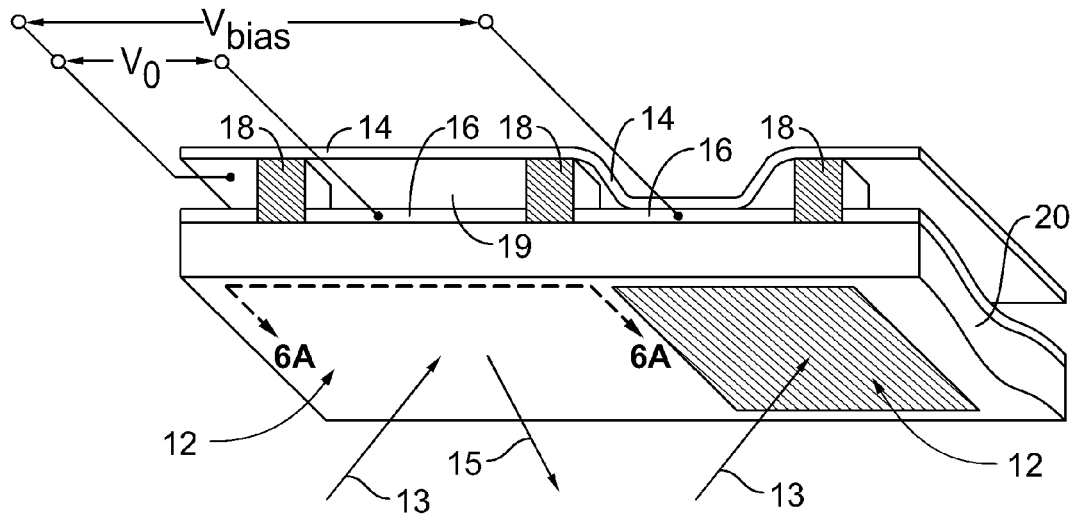
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to a person having ordinary skill in the art.

Display devices including a pixel array formed on a substrate, and having a black mask structure and a mechanical layer are disclosed. The black mask structure can be disposed along sides of pixels in the array to aid in masking optically non-active portions of the electromechanical device. Non-active portions may include, for example, structures that support the mechanical layer, signal busses, and other structures that are not designed to reflect light for displaying information on the pixel array. The mechanical layer can be disposed over the portion of the pixel array formed on the substrate, and can include a mirror layer, a cap layer, and a dielectric layer positioned between the mirror and cap layers. The dielectric layer can include a notch along one or more sides of at least a portion of the pixels in the array, thereby reducing the overlap of the black mask structure and the dielectric layer along pixels sides and improving flatness of the mirror layer. In some implementations, the cap layer and mirror layer are retained in the notch and extend past the dielectric layer and are in contact with each other (e.g., they are electrically connected) along pixel sides. Electrically connecting the mirror and cap layers in the notch can reduce electrical resistance of the mechanical layer, thereby increasing the maximum frequency that the mechanical layer can be actuated and improving display frame rate.

Particular implementations of the subject matter described in this disclosure can be implemented to improve the flatness of a mirror layer after removal of a sacrificial layer. Additionally, some implementations can increase the rate at which the mechanical layer can be switched between actuated and relaxed positions and/or improve the release of the mechanical layer from the actuated position. Furthermore, according to a number of implementations, optical properties of the display can be improved, such as dark state, contrast ratio, gamut, and/or color saturation.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1,000 um, while the gap 19 may be approximately 1-1,000 um, while the gap 19 may be on the order of 1,000-10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
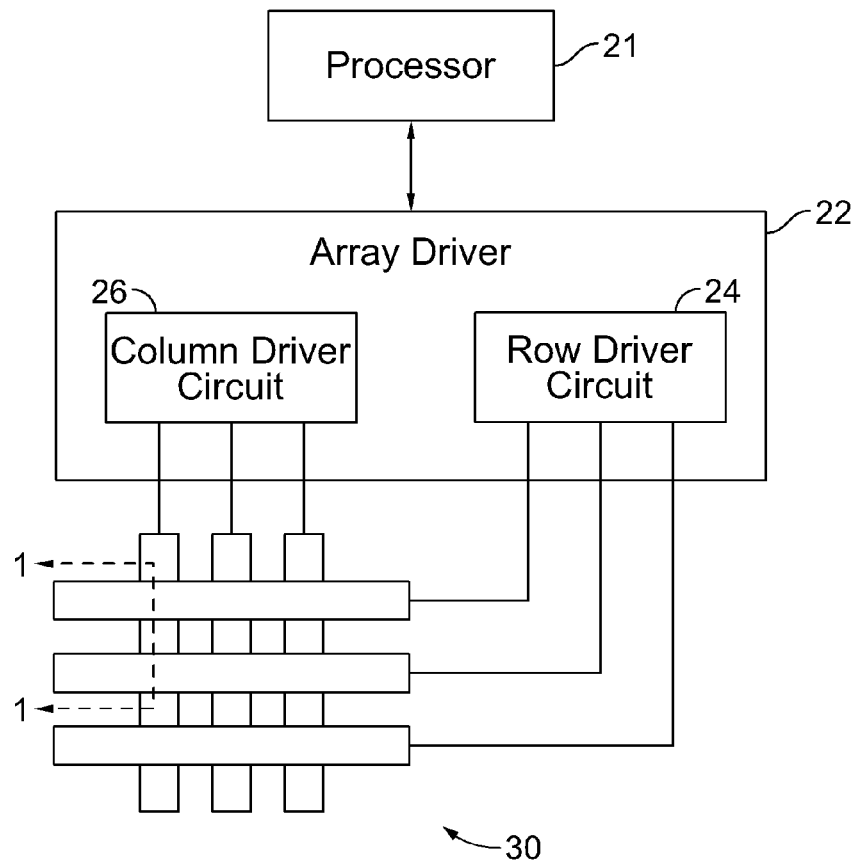
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
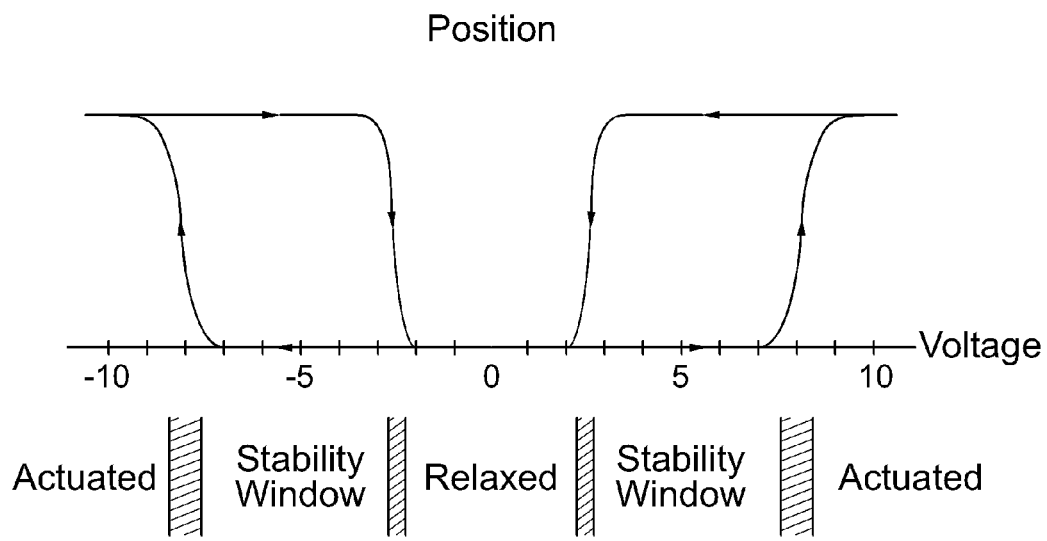
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
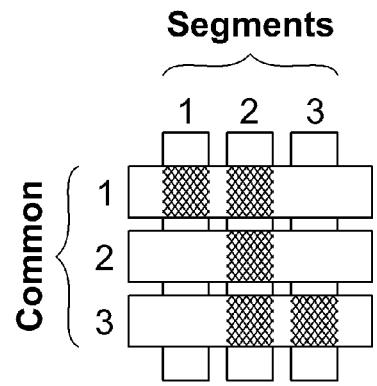
FIG. 5A shows an example of a diagram illustrating a frame of display data in the 3×3 interferometric modulator display of FIG. 2.
Figure 5B:
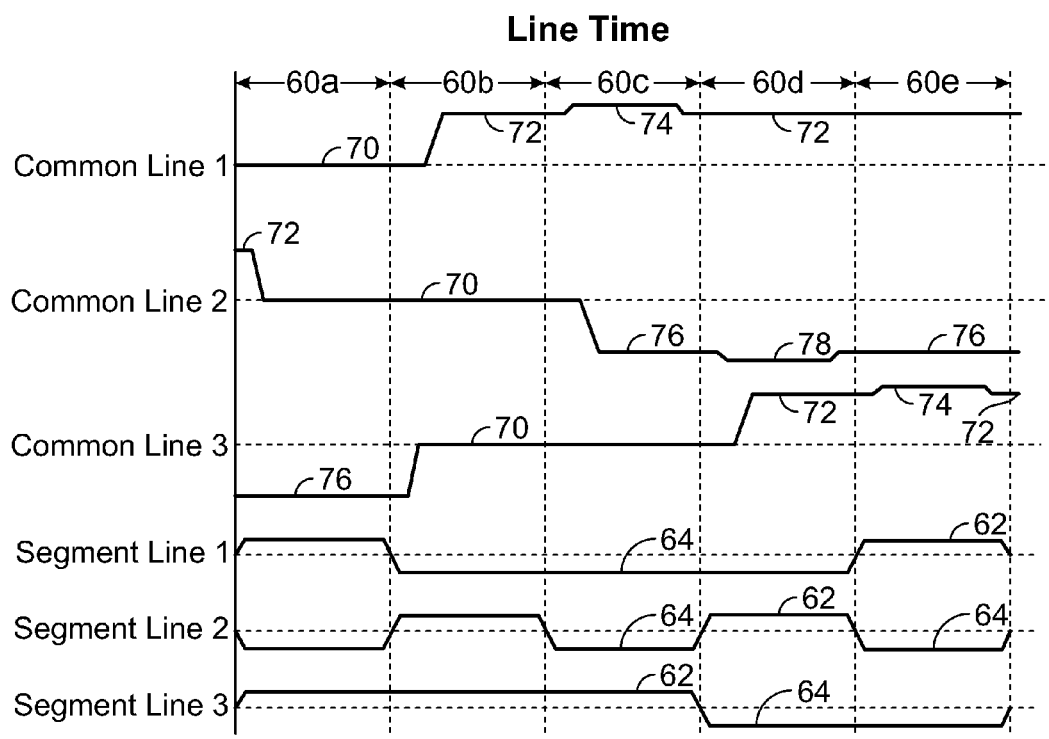
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
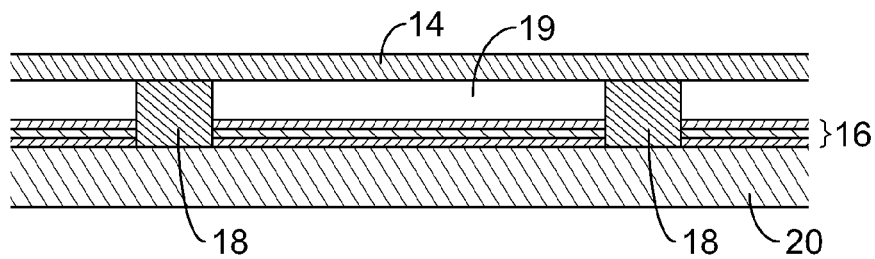
FIG. 6A shows an example of a partial cross-section of the interferometric modulator display of FIG. 1.
Figure 6B:
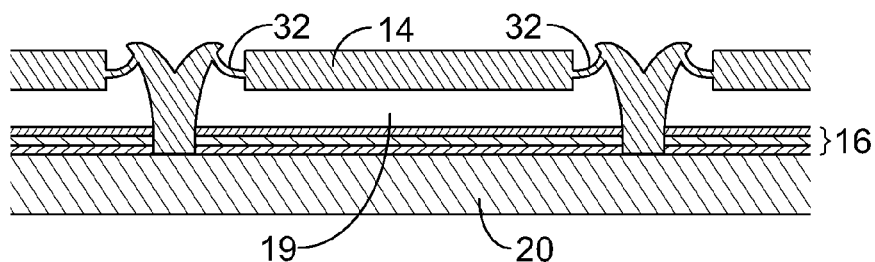
FIGS. 6B-6E show examples of cross-sections of varying implementations of interferometric modulators.
Figure 6C:
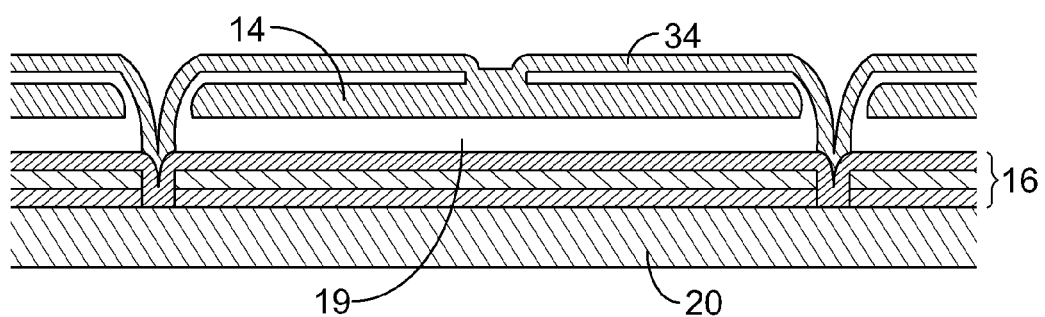

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
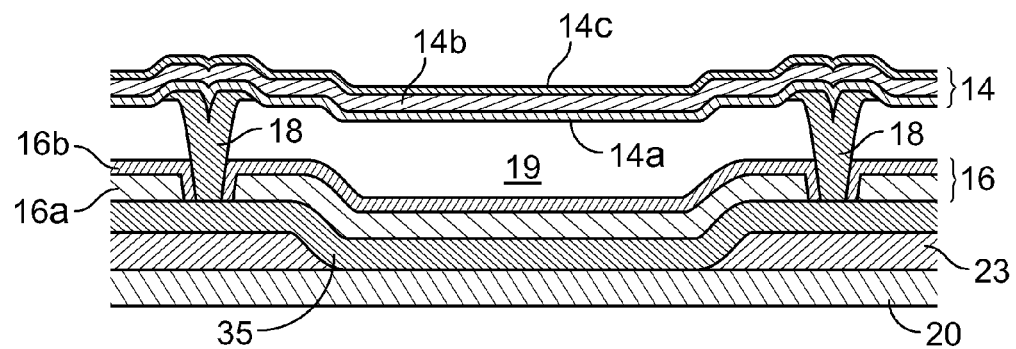

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a silicon dioxide ($SiO_2$) layer, and an aluminum alloy that serves as a reflector and a bussing layer, with a thickness in the range of about 30-80 Å, 500-1,000 Å, and 500-6,000 Å, respectively. The one or more layers can be patterned using a variety of techniques, including photolithography and dry etching, including, for example, tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
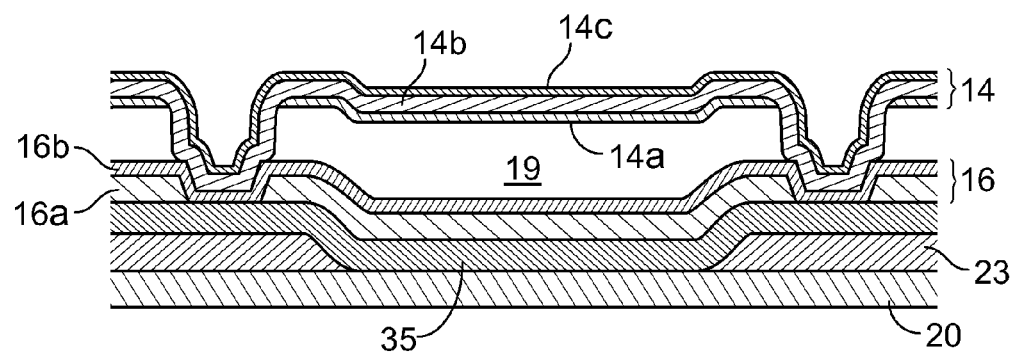

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
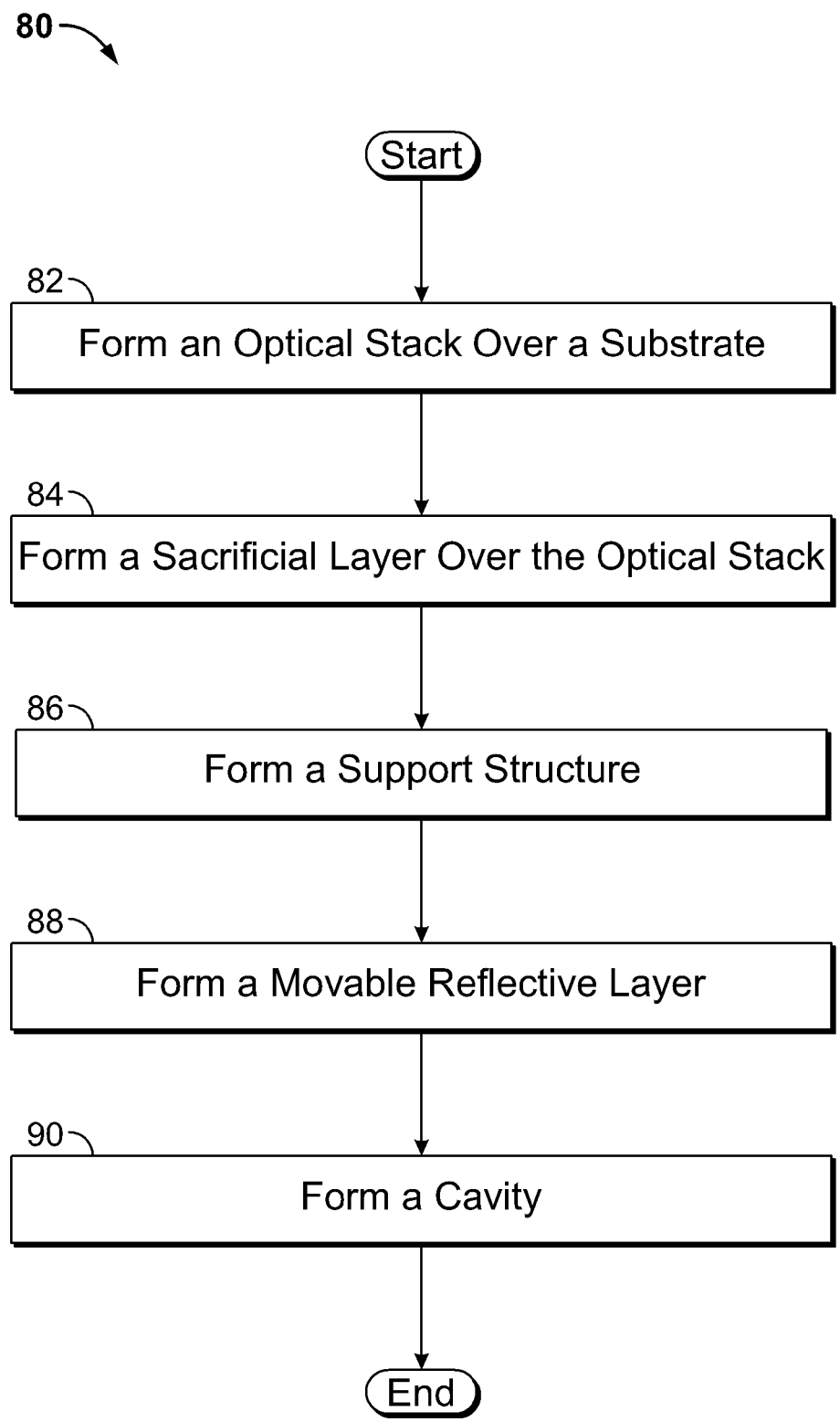
FIG. 7 shows an example of a flow diagram illustrating a manufacturing process for an interferometric modulator.
Figure 8A:
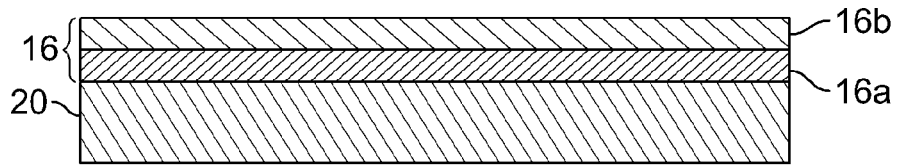
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In the implementation illustrated in FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
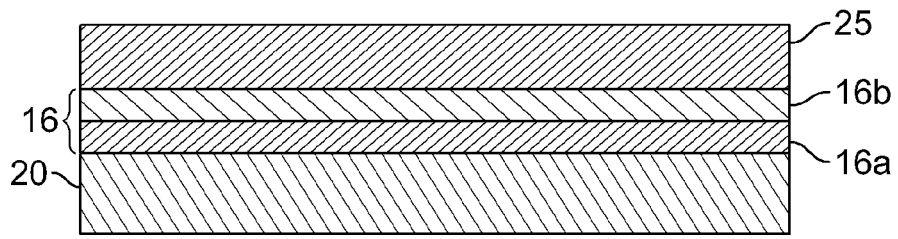

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
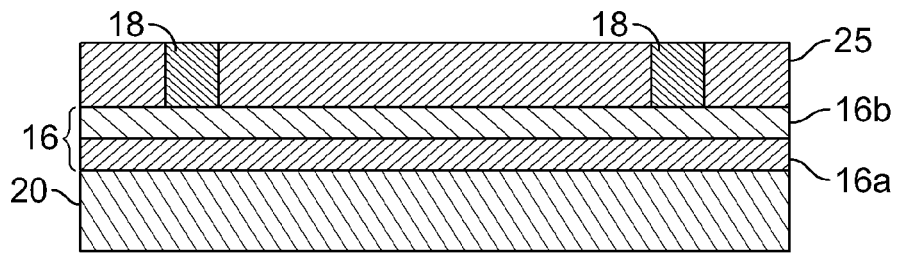

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
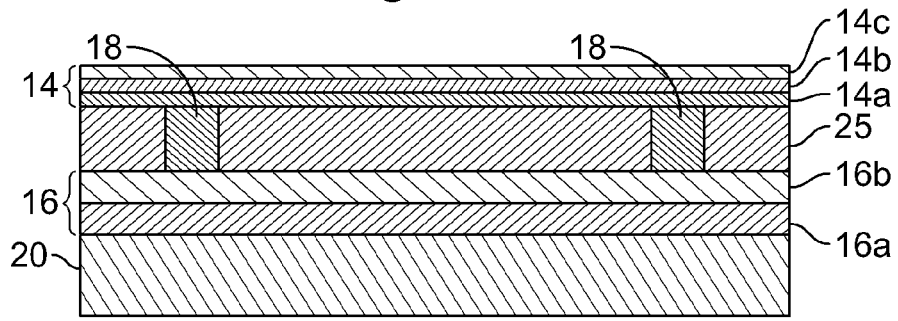
Figure 8E:
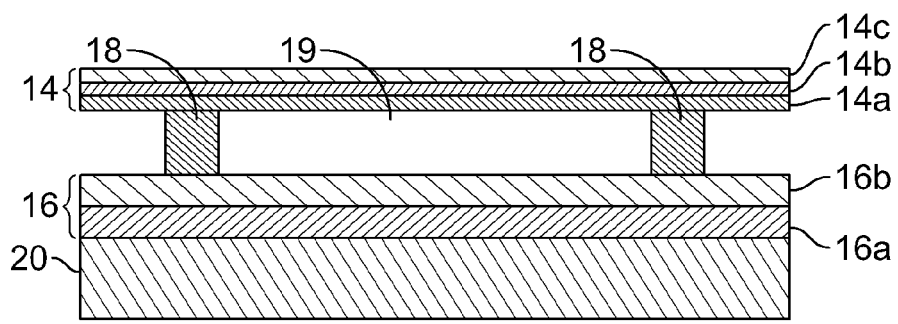

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as molybdenum (Mo) or amorphous silicon (a-Si) may be removed by dry chemical etching, e.g., by exposing the sacrificial layer 25 to a gaseous or vaporous etchant, such as vapors derived from solid xenon difluoride ($XeF_2$) for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Improving the flatness of the mechanical layer of an electromechanical device, and in particular the portion of the mechanical layer in active areas of a pixel, can improve the optical properties of the device. For example, in an interferometric modulator implementation, having a pixel with a relatively flat mechanical layer when the mechanical layer is positioned in the relaxed state can improve uniformity of the reflection of a particular color of light across the pixel. Similarly, increased flatness of the mechanical layer when the device is in the actuated state improves the uniformity of the diminished reflection properties such that the pixel can appear, e.g., uniformly black. Electromechanical devices that are configured to have an improved mechanical layer flatness are disclosed herein. The devices can include black mask structure(s) (sometimes referred to herein as a "black mask" for brevity) disposed along at least one side (or edge) of one or more of the pixels that are disposed (or arranged) in a pixel array.

The devices can further include a mechanical layer disposed over a substrate. The mechanical layer can include a plurality of layers, for example, a mirror layer, a cap layer, and a dielectric layer positioned between the mirror and cap layers. The dielectric layer can be formed to include a notch along one or more sides of some or all of the pixels in the array. The notch has a length dimension that extends along the edge of a pixel, and a width dimension that extends from an edge of the mechanical layer into the mechanical layer, (for example, the notch can extend from a point on the edge of the mechanical layer inward towards an interior portion of the pixel a certain width distance). The notch in the dielectric layer reduces the overlap of the black mask and the dielectric layer along edges of the pixels and can improve the flatness of the mirror layer when the mechanical layer is in the unactuated position. In some implementations, the mirror and cap layers are retained in the notch portion to permit the mirror and cap layers to electrically contact, electrically connecting along pixel sides, thereby reducing mechanical layer resistance and permitting the mechanical layer to be switched between actuated and relaxed positions at an increased rate.

Figure 9:
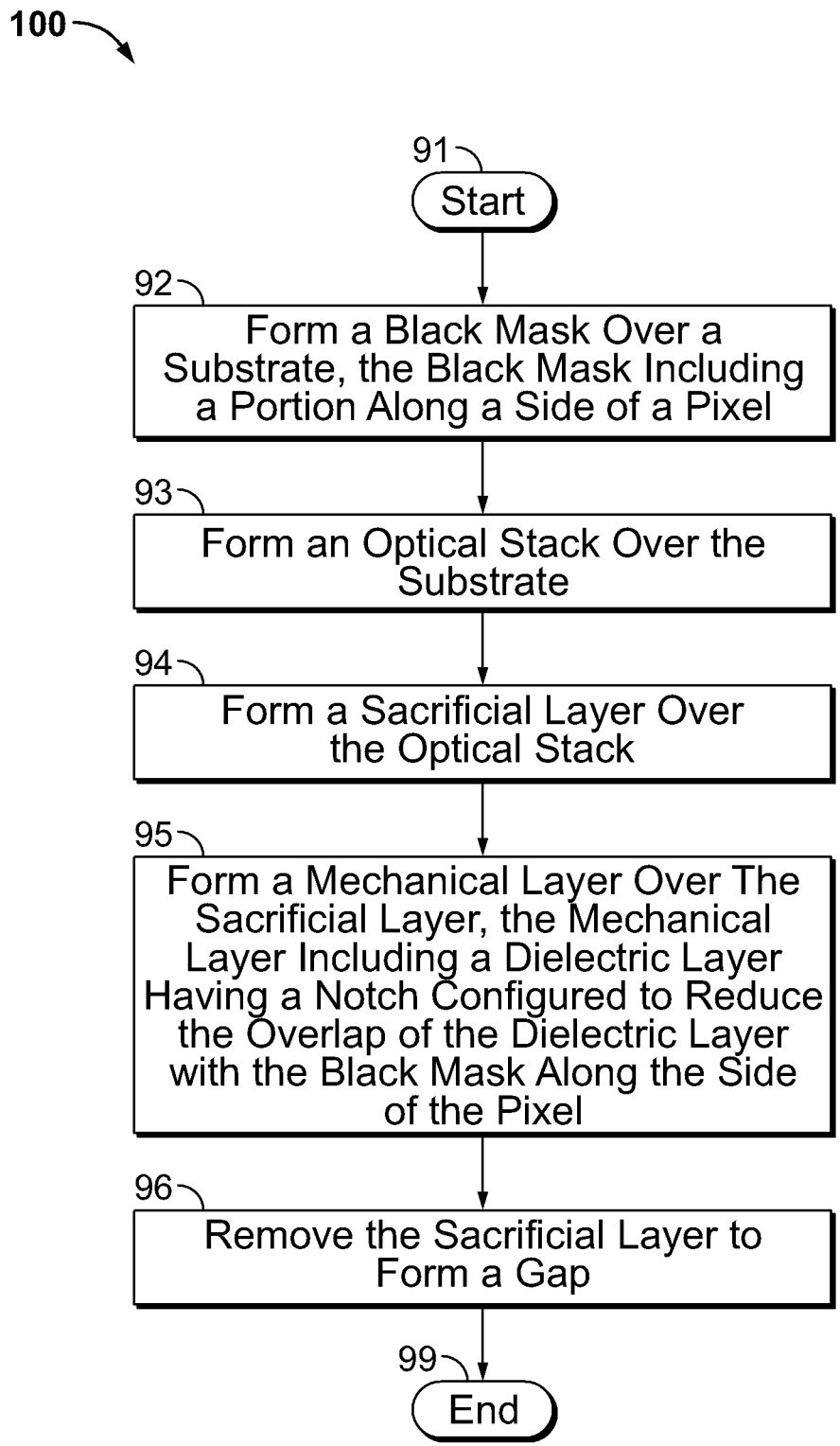
FIG. 9 shows an example of a flow diagram illustrating a manufacturing process for an interferometric modulator.

FIG. 9 shows an example of a flow diagram illustrating a manufacturing process 100 for an interferometric modulator. The process 100 starts at block 91. In block 92, a black mask structure is formed over a substrate. The substrate can be, for example, a transparent substrate including glass or a transparent polymeric material which permits images to be viewed through the substrate. The black mask structure can absorb light in optically non-active pixel regions, such as pixel sides and corners, and can include a portion disposed along a side of a pixel of the interferometric modulator.

The black mask structure can also be conductive and be configured to function as an electrical bussing layer. For example, the black mask structure can be electrically connected to row electrodes of the array to aid in reducing row resistance. The black mask structure can include a plurality of layers. In some implementations, a dielectric layer is disposed over the black mask structure, and openings are provided in the dielectric layer to permit a subsequently deposited layer to electrically contact the black mask structure.

The process 100 continues at a block 93, in which an optical stack is formed over the substrate. The optical stack can be electrically conductive, partially transparent and partially reflective, and can be fabricated, for example, by depositing one or more of the layers onto the transparent substrate. In some implementations, the layers are patterned into parallel strips, and may form row electrodes in a display device, which can be electrically connected to the black mask structure to reduce row resistance, as described above. As used herein, the term "patterned" is used herein to refer to masking as well as etching processes.

The process 100 illustrated in FIG. 9 continues at block 94, in which a sacrificial layer is formed over the optical stack. The sacrificial layer is later removed to form a gap, as will be discussed below. The formation of the sacrificial layer over the optical stack may include deposition of a fluorine-etchable material such as molybdenum (Mo) or amorphous silicon (a-Si), in a thickness selected to provide, after subsequent removal, a gap having the desired size. Multiple sacrificial layers can be deposited to achieve a plurality of gap sizes. For example, for an IMOD array, each gap size can represent a different reflected color.

In a block 95, a mechanical layer is formed over the sacrificial layer. The mechanical layer can be patterned to form columns of the array, and the mechanical layer can include a dielectric layer and mirror and cap layers disposed on opposite sides of the dielectric layer. The mirror layer can reflect light, and the cap layer can be included in the mechanical layer to provide symmetry to the mechanical layer, thereby balancing the mechanical stresses of the mirror layer and improving mirror flatness. Additionally, the mirror and/or cap layers can be electrically conductive and can be used to control the electrical potential of the mechanical layer to aid in switching the mechanical layer between actuated and relaxed positions. The dielectric layer can provide support to the mechanical layer, and can include a notch along the side of the pixel for reducing the overlap of the dielectric layer with the black mask structure along the pixel side. Since the black mask structure can create topological variation across the array, reducing the overlap of the dielectric layer with the black mask structure along pixel sides can improve mirror flatness. In some implementations, portions of the reflective layer and the cap layer are retained in the notch area and are electrically connected along the side of a pixel, thereby reducing resistance of column electrodes of the array and improving the frame rate of a display employing the device.

The process 100 illustrated in FIG. 9 continues at block 96 with the formation of a cavity or gap. The gap may be formed by exposing the sacrificial material deposited at the block 94 to an etchant. For example, a sacrificial material such as molybdenum (Mo), tungsten (W), tantalum (Ta) or polycrystalline silicon (poly-Si) or amorphous silicon (a-Si) can be removed by dry chemical etching. After the sacrificial layer is removed, the mechanical layer is typically released and can be moved by electrostatic forces between actuated and relaxed positions by application of a voltage between the stationary electrode and the mechanical layer. The process 100 illustrated in FIG. 9 ends at 99. Additional details of the method can be as described below. Additional steps may be employed before, in the middle of, or after the illustrated sequence, but are omitted for clarity.

Figure 10:
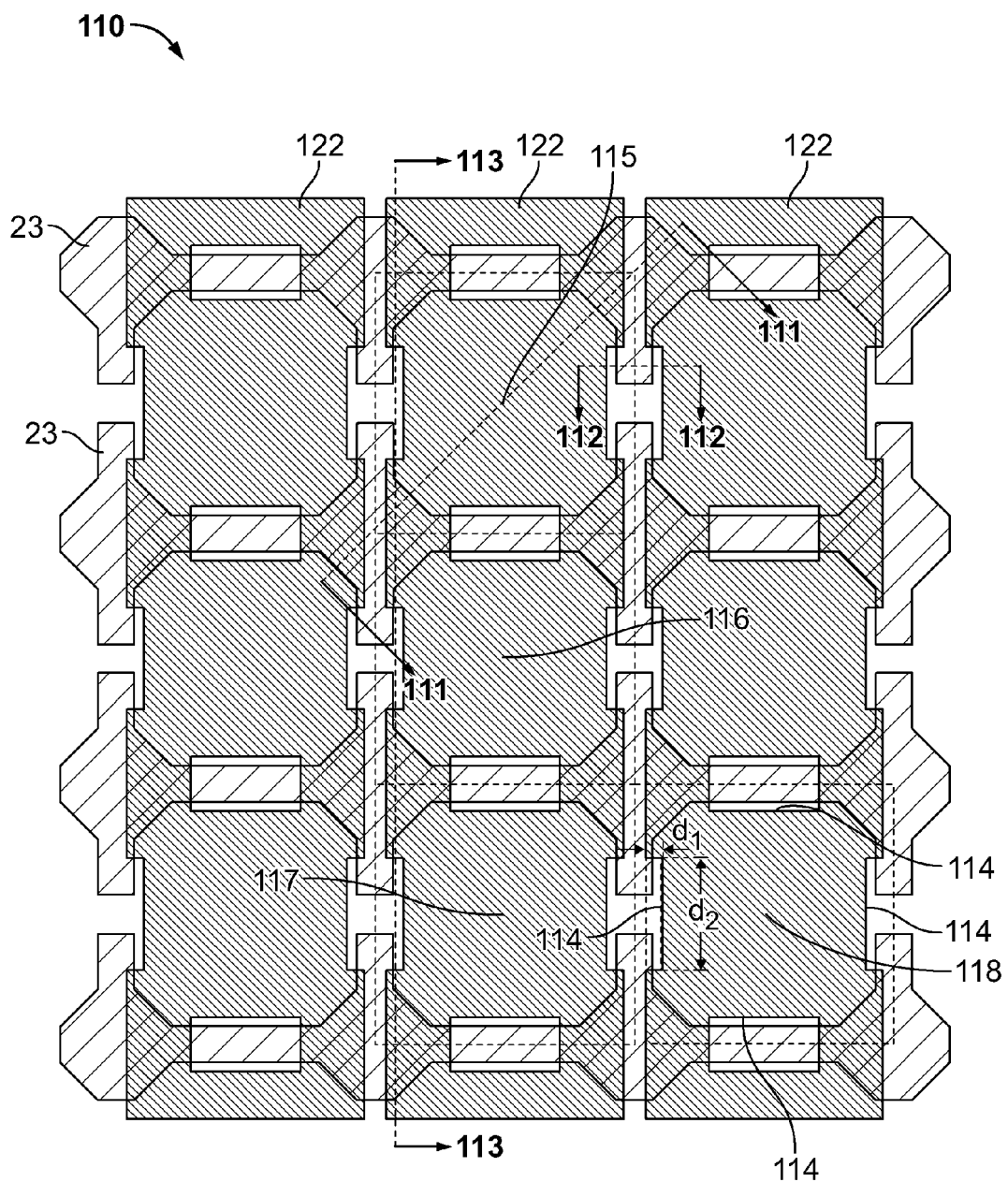
FIG. 10 shows an example of a plan view schematic illustration of an interferometric modulator array.

FIG. 10 shows an example of a plan view schematic illustration of an interferometric modulator array 110. The interferometric modulator array 110 includes a plurality of pixels arranged in an array, and can be representative of a much larger array of pixels similarly configured. The array 110 including a first pixel 115, a second pixel 116, a third pixel 117, and a fourth pixel 118. The interferometric modulator array 110 further includes a black mask structure 23 and a dielectric layer 122 which is part of a mechanical layer. Although not illustrated in FIG. 10 for clarity, the interferometric modulator array 110 includes other structures. For example, the mechanical layer can further include a mirror layer and a cap layer disposed on opposite sides of the dielectric layer 122. An optical stack can be disposed over the black mask structure 23, and the optical stack and the mirror layer can be separated by an air gap that operates as an interferometric cavity. In some implementations, the pixels of the interferometric modulator array 110 can be pixels of different gap sizes selected to interferometrically enhance different colors. For example, the first pixel 115 can be a high gap pixel configured to interferometrically enhance blue, the second pixel 116 can be a mid gap pixel configured to interferometrically enhance red, and the third pixel 117 can be a low gap pixel configured to interferometrically enhance green.

The black mask structure 23 can be electrically connected to a stationary electrode of the optical stack to form row electrodes of the array. Additionally, the mirror layer and the cap layers can be disposed on opposite sides of the dielectric layer 122 to form a mechanical layer, which can operate as a column electrode of the array.

As shown in FIG. 10 the black mask structure 23 is disposed at each corner of the pixels of the interferometric modulator array 110 and along a portion of each side of a pixel to absorb light between pixels, e.g., in the optically non-active areas of the array. Because a black mask structure 23 having a larger width dimension can reduce fill factor of the interferometric modulator array 110, the black mask structure 23 can be formed to have a relatively large thickness which is selected to provide a desired row resistance. The thickness of the black mask structure 23 can create a topology that can impact layers deposited conformally over the black mask structure, such as the dielectric layer 122 and/or other layers of the mechanical layer. The topology variation caused by the black mask can create edges in the mechanical layer, including the mirror layer and the cap layer, when the mechanical layer is deposited over the black mask structure 23 along pixel sides.

Edges in the mechanical layer that are disposed along the sides of a pixel can, if not relatively flat, decrease performance of the display. For example, non-flat edges in the mechanical layer can produce optical artifacts, such as colored rings, which can reduce image quality. Additionally, edges in the mechanical layer can reduce mirror flatness and hinder the actuation of the mechanical layer between actuated and relaxed states.

To aid in reducing the topological impacts of the black mask structure 23, the dielectric layer 122 of the mechanical layer has been patterned to include notches 114 along pixel sides in the array. For example, the pixel 118 includes a notch along each pixel side. The notches 114 can be dimensioned to reduce the overlap of the dielectric layer 122 and the black mask structure 23, thereby improving mirror flatness, as will be described in further detail below.

The notches 114 can have any suitable size. In one implementation, the notches 114 each have a width dimension $d_1$ extending into the dielectric layer 122 of the pixel that ranges between about 0.5 μm to about 5 μm. The notches 114 can have any suitable length along the edge of the pixel. For example, the notches 114 can each have a length dimension $d_2$ extending along the side of the pixel ranging between about 2 μm to about 30 μm.

FIG. 10 illustrates a configuration in which the dielectric layer 122 includes a notch along each side of each pixel in the array. However, in some implementations, the dielectric layer 122 does not include a notch on every pixel side. Additionally, the notches 114 need not be identically shaped along each pixel side or have identical dimensions along each side of a pixel. For example, a notch disposed on a particular side of a pixel can be dimensioned relative to the shape of the black mask structure 23 along that pixel side.

FIGS. 11A-11H show examples of cross-sectional schematic illustrations of various stages in a method of making the interferometric modulator array 110 of FIG. 10 taken along the line 111-111. While particular parts and steps are described as suitable for interferometric modulator implementations, for other electromechanical systems implementations different materials can be used or parts modified, omitted, or added.

Figure 11A:
FIGS. 11A-11H show examples of cross-sectional schematic illustrations of various stages in a method of making the interferometric modulator array of FIG. 10 taken along the line 111-111.

In FIG. 11A, a black mask structure 23 has been provided over a substrate 20. The substrate 20 can include a variety of transparent materials, as was described above. One or more layers can be provided on the substrate before forming the black mask structure 23. For example, an etch-stop layer can be provided before depositing the black mask structure 23 to serve as an etch-stop when patterning the black mask. In one implementation, the etch-stop layer is an aluminum oxide layer ($AlO_x$) having a thickness in the range of about 50-250 Å, for example, about 160 Å. The black mask structure 23 can include multiple layers to aid in absorbing light and functioning as an electrical bussing layer, as was described above.

Figure 11B:
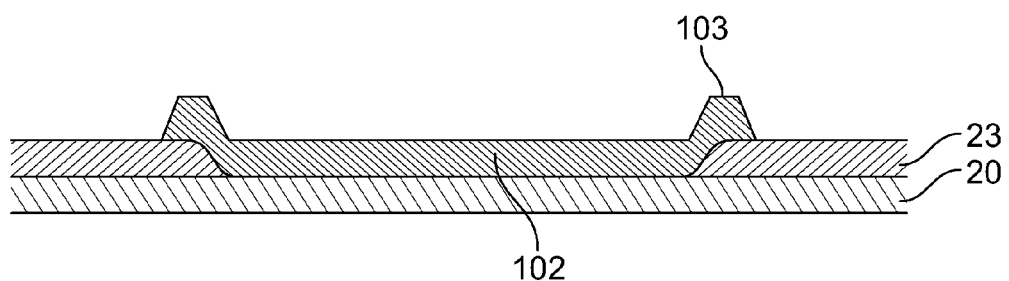

FIG. 11B illustrates providing a shaping structure 102 over the substrate 20. The shaping structure 102 can include a buffer oxide layer, such as a silicon dioxide ($SiO_2$) layer. The shaping structure 102 can be formed to have a height selected to be equal to about that of the black mask structure 23 to aid in maintaining a relatively planar profile across the substrate 20 by filling in gaps between the black mask structures 23. However, the shaping structure 102 can overlap a portion of the black mask structure 23 to aid in forming a kink in the mechanical layer, as will be described in detail later below. In particular, one or more layers, including the mechanical layer, can be deposited over the shaping structure 102 and any intervening layers, thereby substantially replicating the geometric features of the shaping structure 102. For example, as illustrated in FIG. 11B, the shaping structure 102 can overlap the black mask structure 23 to form a protrusion 103, which can produce an upwardly extending wave or kink in a subsequently deposited mechanical layer. Although various electromechanical systems devices illustrated herein are shown and described as including the shaping structure 102, the methods of forming a mechanical layer as described herein can be applicable to processes lacking the shaping structure 102.

Figure 11C:
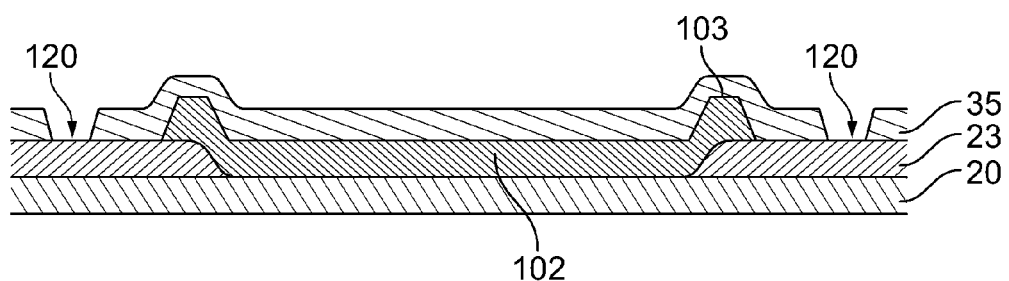

FIG. 11C illustrates providing and patterning a dielectric layer 35. The dielectric layer 35 can include, for example, silicon dioxide ($SiO_2$), silicon oxynitride (SiON), and/or tetraethyl orthosilicate (TEOS). In one implementation, the thickness of the dielectric layer 35 is in the range of about 3,000-6,000 Å. However, the dielectric layer 35 can have a variety of thicknesses depending on desired optical properties. The dielectric layer can be removed over a portion above the black mask structure 23 ("above" here referring to the side of the black mask structure 23 opposite the substrate 20), so as to permit formation of vias 120 for electrically connecting a stationary electrode to the black mask structure 23, as will be described in detail below.

Figure 11D:
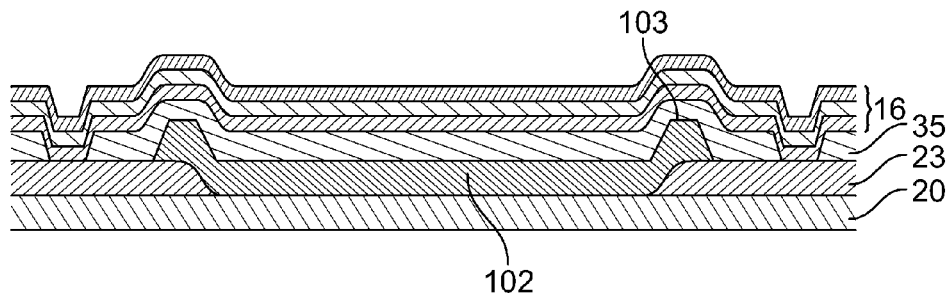

FIG. 11D illustrates providing and patterning an optical stack 16 over the dielectric structure 35. The optical stack 16 can include a plurality of layers, such as a stationary electrode layer, a transparent dielectric layer, and an etch-stop layer for protecting the transparent dielectric layer during subsequent sacrificial layer etch and/or release processes. In one implementation, the optical stack 16 includes a molybdenum-chromium (MoCr) stationary electrode layer having a thickness in the range of about 30-80 Å, a silicon dioxide ($SiO_2$) transparent dielectric layer having of thickness in the range of about 250-500 Å, and an aluminum oxide ($AlO_x$) etch-stop layer having a thickness in the range of about 50-150 Å. As illustrated in FIG. 11D, one or more layers of the optical stack 16 may physically and electrically contact the black mask structure 23 in the vias 120 of FIG. 11C. Electrically connecting the black mask structure 23 to the stationary electrode layer of the optical stack 16 can aid in reducing row resistance in a pixel array.

Figure 11E:
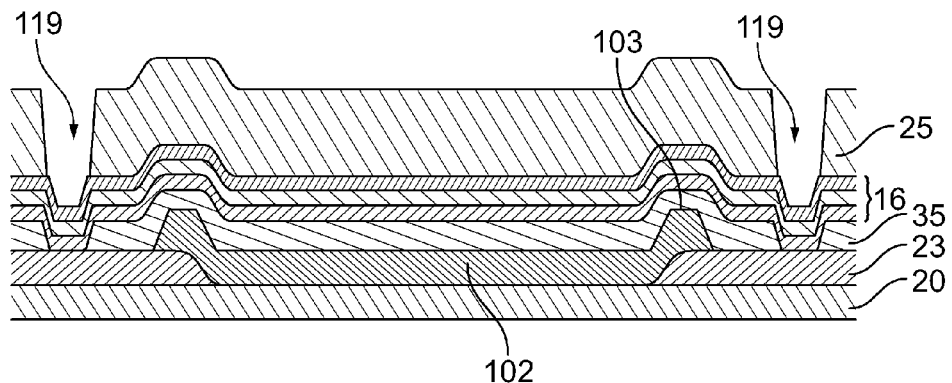

FIG. 11E illustrates providing and patterning a sacrificial layer 25 over the optical stack 16. The sacrificial layer 25 is typically later removed to form a gap. The formation of the sacrificial layer 25 over the optical stack 16 can include a deposition step, as described above with reference to FIG. 9. Additionally, the sacrificial layer 25 can be selected to include more than one layer, or include a layer of varying thickness, to aid in the formation of a display device having a multitude of resonant optical gaps. For an IMOD array, each gap size can represent a different reflected color. As illustrated in FIG. 11E, the sacrificial layer 25 can be patterned over the black mask structure 23 to form support post apertures 119, which can aid in the formation of support posts, as will be described below.

Figure 11F:
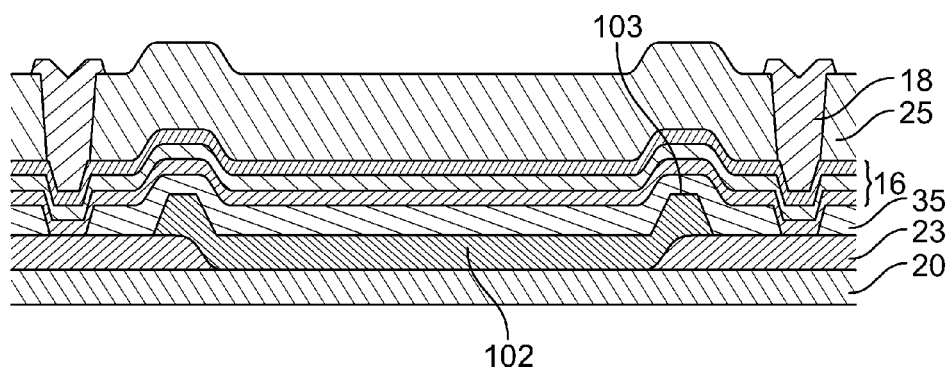

FIG. 11F illustrates providing and patterning a support layer over the sacrificial layer 25 to form support posts 18. The support posts 18 can be formed from, for example, silicon dioxide ($SiO_2$) and/or silicon oxynitride (SiON), and the support layer may be patterned to form the support posts 18 by a variety of techniques, such as using a dry etch including carbon tetrafluoromethane ($CF_4$) and/or oxygen ($O_2$). As illustrated in FIG. 11F the support posts 18 can be positioned at pixel corners.

Figure 11G:
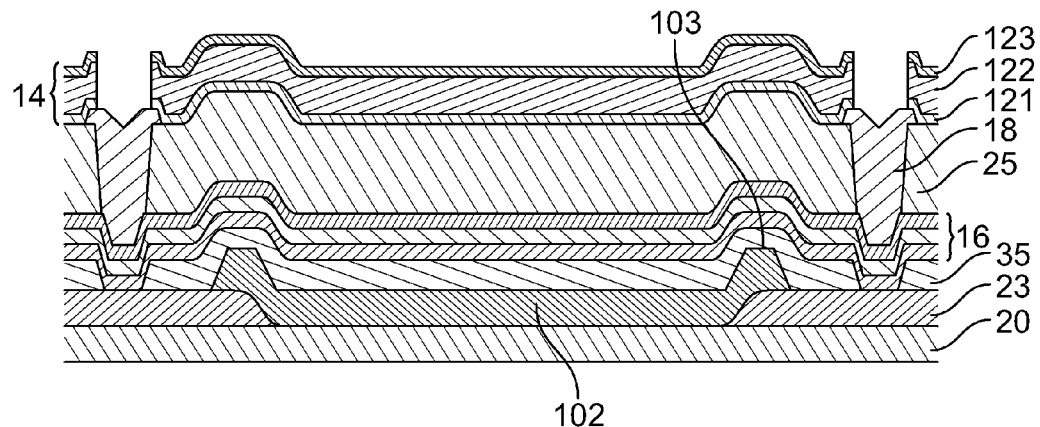

FIG. 11G illustrates providing and patterning a mechanical layer 14 over the sacrificial layer 25. The mechanical layer 14 includes a reflective or mirror layer 121, a dielectric layer 122, and a cap or conductive layer 123. The mechanical layer 14 has been patterned over support posts 18 to aid in forming columns of the pixel array. Although not illustrated in FIG. 11G, the dielectric layer 122 can also be patterned along pixel sides to form notches, as will be described in further detail below with reference to FIGS. 12A-12C.

The mirror layer 121 can be any suitable reflective material, including, for example, a metal, such as an aluminum alloy. In one implementation, the mirror layer 121 includes aluminum-copper (AlCu) having copper by weight in the range of about 0.3% to 1.0%, for example, about 0.5%. The thickness of the mirror layer 121 can be any suitable thickness, such as in the range of about 200-500 Å, for example, about 300 Å.

The dielectric layer 122 can be a dielectric layer of, for example, silicon oxynitride (SiON), and the dielectric layer 122 can have any suitable thickness, such as a thickness in the range of about 500-8,000 Å. However, the thickness of the dielectric layer 122 can be selected depending on a variety of factors, including, for example, the desired stiffness of the dielectric layer 122, which can aid in achieving the same pixel actuation voltage for different sized air-gaps for color display applications.

As illustrated in FIG. 11G, the cap or conductive layer 123 can be provided conformally over the dielectric layer 122 and patterned similar to the pattern of the mirror layer 121. The conductive layer 123 can be a metallic material including, for example, the same aluminum alloy as the mirror layer 121. In one implementation, the conductive layer 123 includes aluminum-copper (AlCu) having copper by weight in the range of about 0.3% to 1.0%, for example, about 0.5%, and the thickness of the conductive layer 123 is selected to be in the range of about 200-500 Å, for example, about 300 Å. The mirror layer 121 and the conductive layer 123 can be selected to have similar thickness and composition, thereby aiding in balancing stresses in the mechanical layer and improving mirror flatness by reducing sensitivity of gap height to temperature.

Figure 11H:
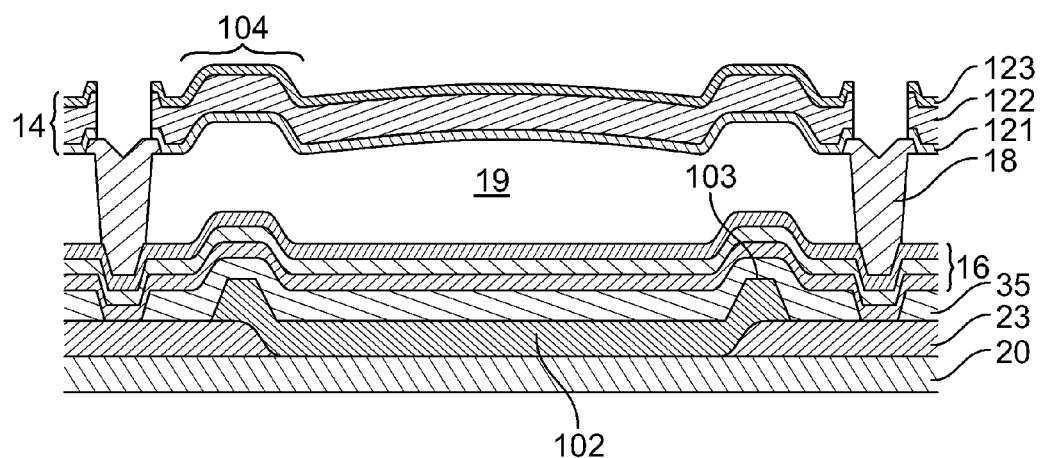

FIG. 11H illustrates the interferometric device after removal of the sacrificial layer 25 of FIG. 11G to form a gap 19. The sacrificial layer 25 may be removed at this point using a variety of methods, as described above with reference to FIG. 9.

After removal of the sacrificial layer 25, the mechanical layer 14 can become displaced away from the substrate 20 by a launch height and can change shape or curvature at this point for a variety of reasons, such as residual mechanical stresses in the mirror layer 121, the dielectric layer 122, and/or the cap layer 123. As described above, the cap layer 123 can aid in balancing stresses of the mirror layer 121 by providing symmetry to the mechanical layer 14, thereby improving flatness of the mechanical layer 14 upon release. Additionally, providing the mechanical layer 14 over the shaping structure 102, and particularly over the protrusion 103, has formed a kink 104 in the mechanical layer 14. The geometry of the kink 104 can impact the residual stresses of the mechanical layer 14, thus impacting mirror flatness after release. The geometric features of the kink 104 can be controlled by varying the thickness of the shaping structure 102 and/or by controlling the overlap of the shaping structure 102 and the black mask structure 23.

Figure 12A:
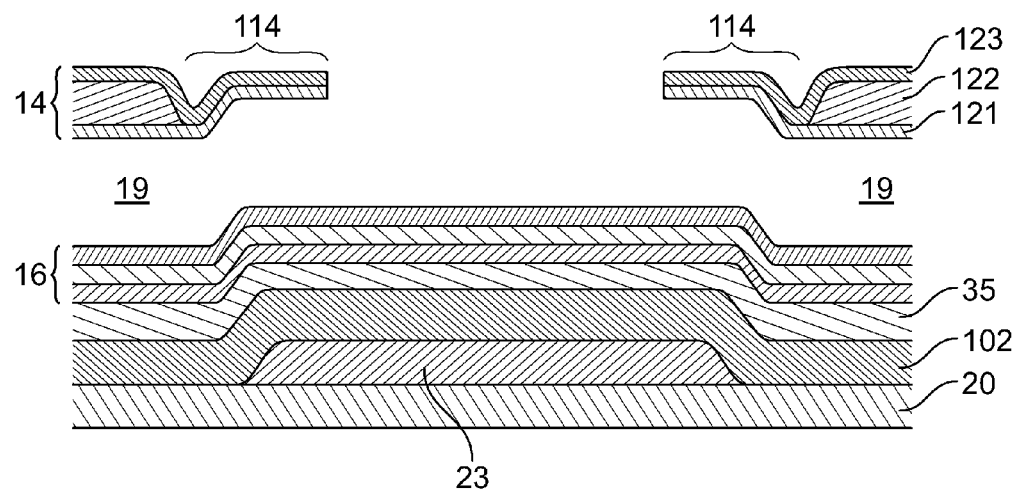
FIGS. 12A-12C show examples of cross-sections of varying implementations of the interferometric modulator array of FIG. 10 taken along the line 112-112.
Figure 12B:
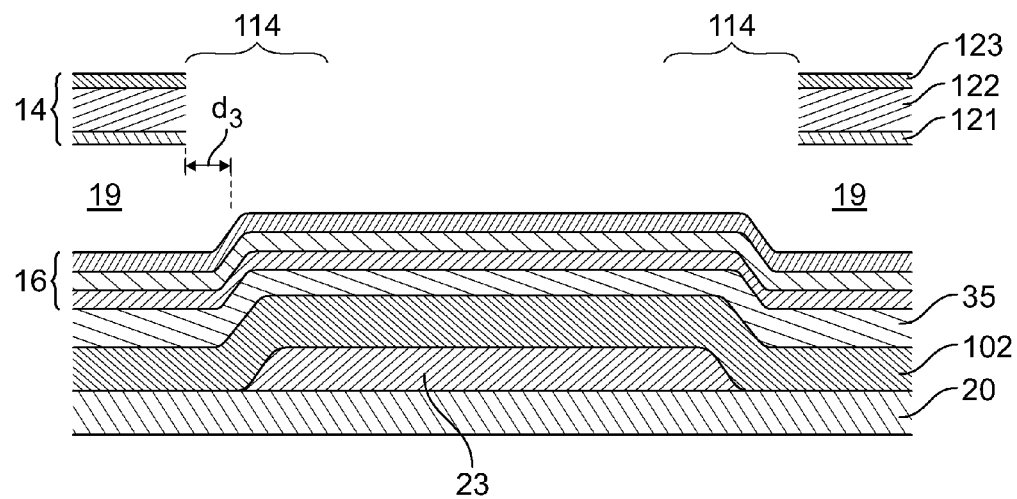
Figure 12C:
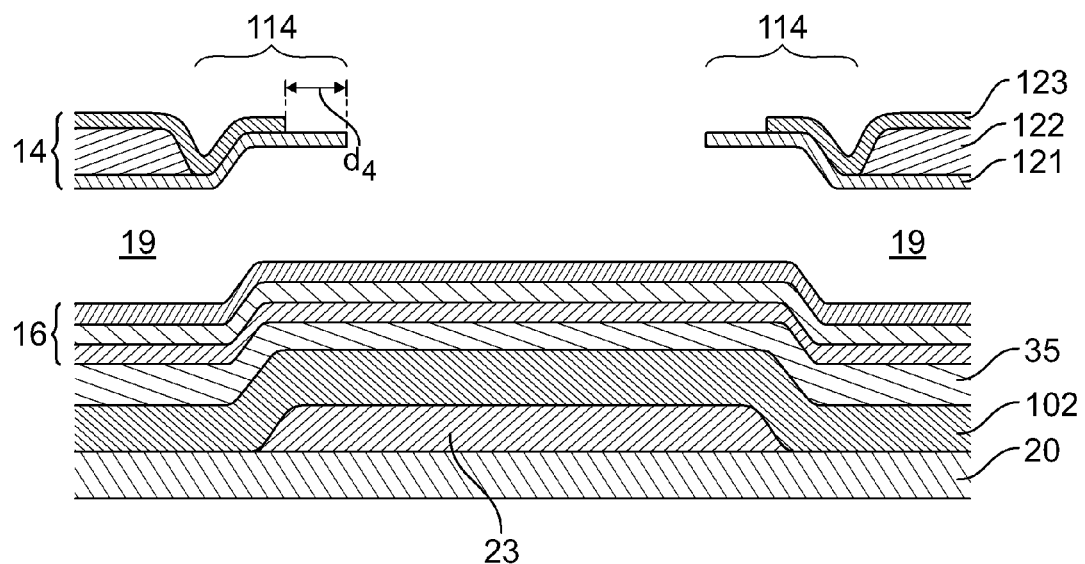

FIGS. 12A-12C show examples of cross-sections of varying implementations of the interferometric modulator array 110 of FIG. 10 taken along the line 112-112. The illustrated cross-sections each include a substrate 20, a shaping structure 102, a dielectric structure 35, an optical stack 16, gaps 19, and a mechanical layer 14 that includes a mirror layer 121, a dielectric layer 122, and a cap layer 123. Additional details of these layers can be as described above.

In the cross-section of FIG. 12A, the dielectric layer 122 has been removed in the notches 114, but the mirror layer 121 and the cap layer 123 have not been removed in the notches 114. Rather, the mirror layer 121 and the cap layer 123 extend past a portion of the dielectric layer 122 in each notch and electrically contact one another. Allowing the mirror layer 121 and the cap layer 123 to electrically contact in the notches 114 reduces resistance of the column electrodes formed from the mechanical layer 14. Reducing electrical resistance of the mechanical layer 14 can increase the maximum frequency that the mechanical layer can be switched between the actuated and relaxed positions, thereby improving the maximum frame rate of the display.

In FIG. 12B, the mirror layer 121, the dielectric layer 122, and the cap layer 123 of the mechanical layer 14 have each been removed in the notches 114. As shown in FIG. 12B, removing the layers of the mechanical layer in the notches 114 can reduce or eliminate an overlap of the mechanical layer 14 with the black mask structure 23, thereby avoiding formation of an edge in the mechanical layer 14 along sides of the pixel. Since an edge along the side of the pixel can reduce mirror flatness and degrade display performance, providing the notches 114 in the mechanical layer can improve optical properties of the array. In one implementation, the distance $d_3$ from the edge of the mechanical layer 14 to the edge of the black mask structure 23 in the notches 114 is selected to be in the range of about 0 μm to about 1 μm.

In FIG. 12C, the dielectric layer 122 and a portion of the cap layer 123 has been removed in the notches 114, but the mirror layer 121 has not been removed in the notches 114. The illustrated cross-section shows that the mirror layer 121 and the cap layer 123 need not have the same shape in the notch 114. For example, the mirror layer 114 can extend past the cap layer 123 in each notch by a distance $d_4$ ranging between about 0 μm to about 1.5 μm.

Figure 13A:
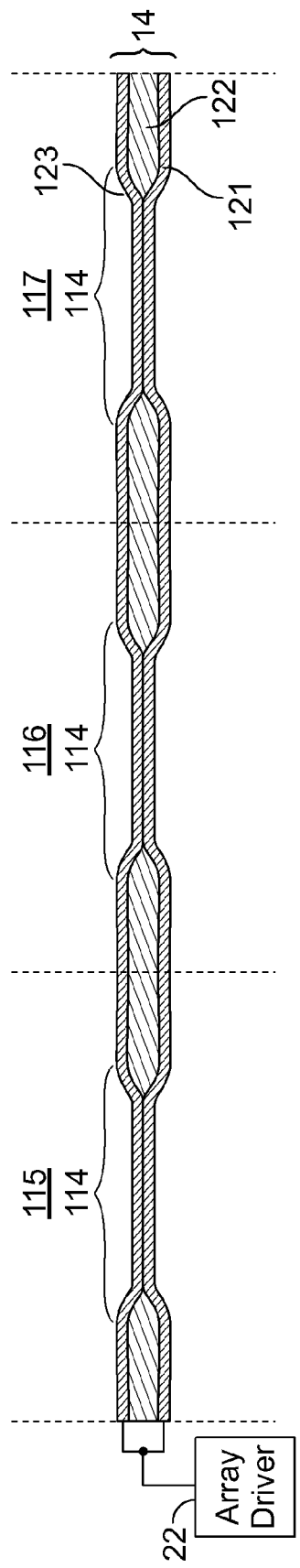
FIG. 13A is an example cross-section of the mechanical layer of the interferometric modulator array of FIG. 10 taken along the line 113-113.

FIG. 13A is an example cross-section of the mechanical layer of the interferometric modulator array 110 of FIG. 10 taken along the line 113-113. The cross-section of the mechanical layer 14 corresponds to an implementation in which the mirror layer 121 and the cap layer 123 have been retained in the notches 114, such as in the cross-section of FIG. 12A. The mechanical layer 14 includes a first portion associated with the first pixel 115, a second portion associated with the second pixel 116, and a third portion associated with the third pixel 117. The first, second and third pixels 115-117 are disposed in a column as shown in FIG. 10, and the illustrated cross-section of the mechanical layer 14 can represent a portion of a column electrode of a pixel array.

The mirror layer 121 and the cap layer 123 of the mechanical layer 14 is shown as being electrically connected to the array driver 22, which can be used to control the electrical potential of the mechanical layer 14 so as to aid in switching the mechanical layer 14 between actuated and relaxed states. As shown in FIG. 13A, the mirror layer 121 and the cap layer 123 electrically contact each other in the notches 114, which can aid in reducing column electrode resistance as will be described below.

Figure 13B:
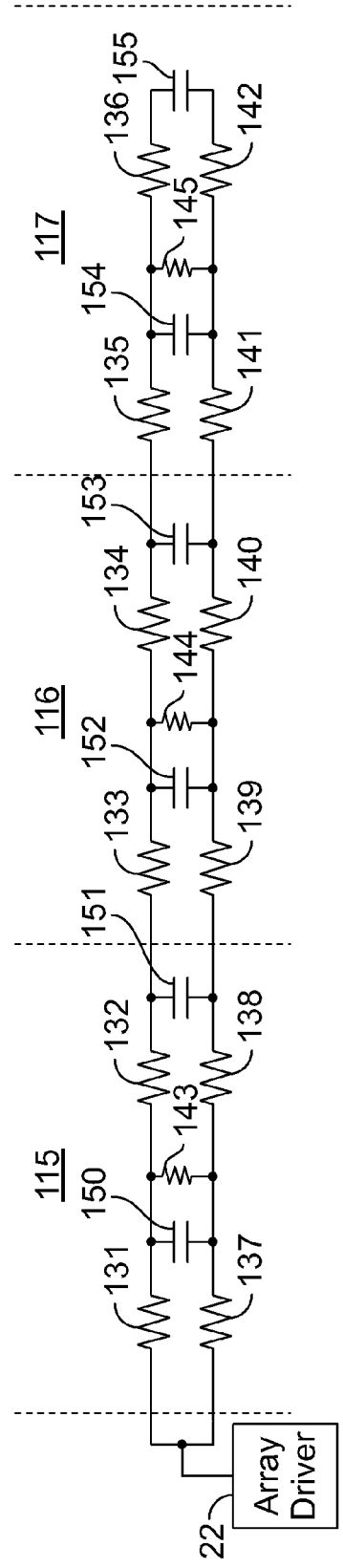
FIG. 13B is a circuit diagram of an example resistor-capacitor (RC) circuit model for the cross-section of the mechanical layer illustrated in FIG. 13A.

FIG. 13B is a circuit diagram of an example resistor-capacitor (RC) circuit model for the cross-section of the mechanical layer 14 illustrated in FIG. 13A. The illustrated circuit includes a first plurality of resistors 131-136, a second plurality of resistors 137-142, a third plurality of resistors 143-145, and a plurality of capacitors 150-155. As illustrated in FIG. 13B, the array driver 22 is electrically connected to one end of the mechanical layer 14, and can be used to vary the voltage of the mechanical layer 14 so as to aid in switching the mechanical layer 14 between actuated and relaxed positions.

The illustrated circuit diagram is a circuit timing model of delay of the mechanical layer 14 based on modeling the electrically conductive mirror and cap layers 121,123 using a distributed RC pi-model. For example, the first plurality of resistors 131-136 are electrically connected end-to-end in series, and can represent the resistance of the cap layer 123 across the first, second and third pixels 115-117 of the column electrode formed from the mechanical layer 14. Likewise, the second plurality of resistors 137-142 are electrically connected end-to-end in series, and can represent the resistance of the mirror layer 121 across the first, second and third pixels 115-117 of the column electrode. The separation of the electrically conductive mirror and cap layers 121, 123 by the non-conductive dielectric layer 122 can create capacitance between the mirror and cap layers 121, 123 that can be modeled using the first plurality of capacitors 150-155.

Electrically connecting the mirror layer and cap layers 121, 123 in the notches 114 can increase the frequency at which the array driver 22 can toggle the voltage of the column electrode formed from the mechanical layer 14. For example, the electrical connections between the mirror and cap layers 121, 123 in the notches 114 can be represented by the third plurality of resistors 143-145, which can reduce the RC delay of the mechanical layer 14 seen by the array driver 22 by reducing the resistance between the array driver 22 and each of the capacitors 151-155. By reducing the resistance of the mechanical layer 14, the array driver 22 can vary the electrical potential of column electrodes at an increased frequency, thereby permitting the display to operate at a higher frame rate.

Figure 14:
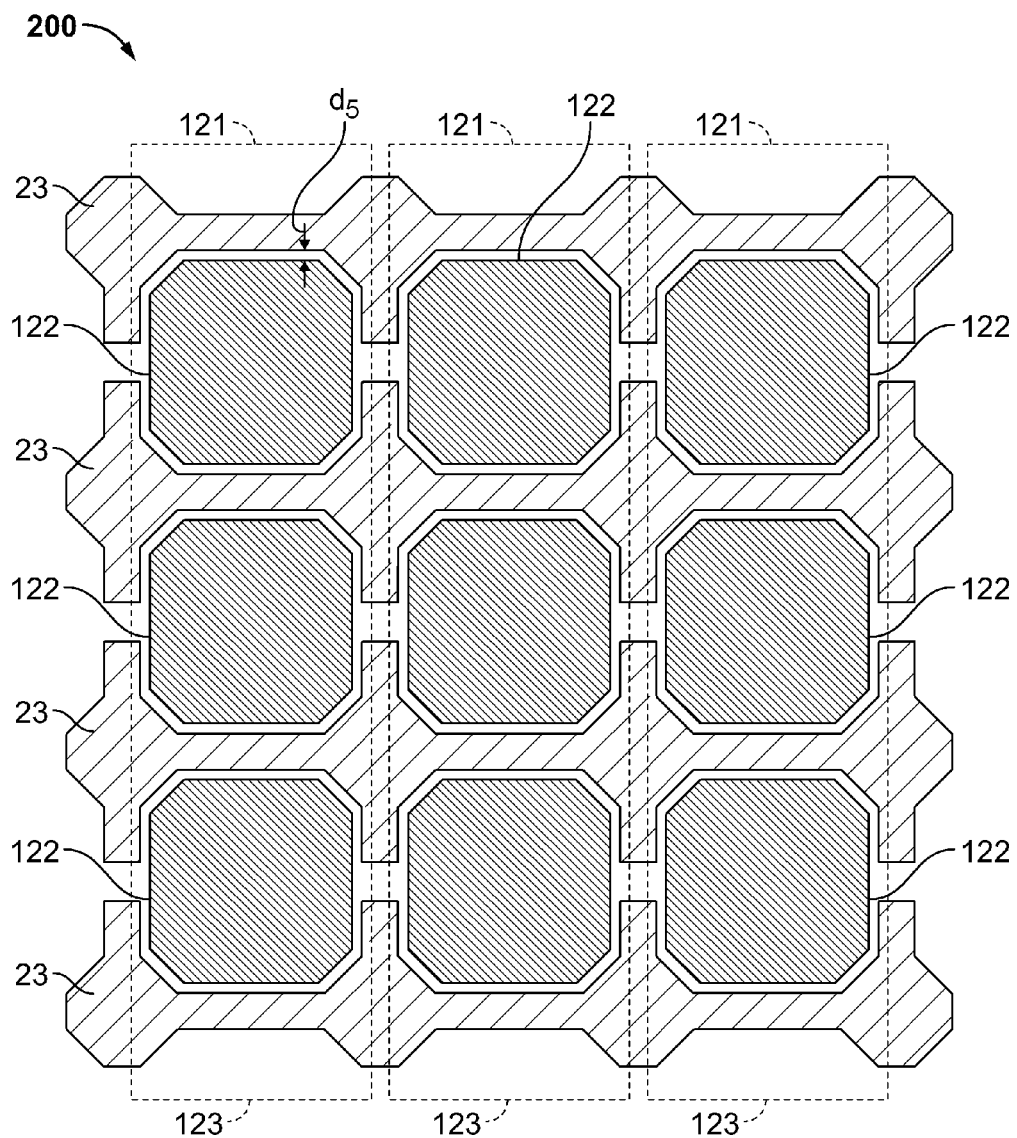
FIG. 14 shows an example of a plan view schematic illustration of an interferometric modulator array.

FIG. 14 shows an example of a plan view schematic illustration of an interferometric modulator array 200. The interferometric modulator array 200 includes a plurality of pixels arranged in an array, and can be representative of a much larger array of pixels similarly configured. In some implementations, the pixels of the interferometric modulator array 200 can be pixels of different gap sizes selected to interferometrically enhance different colors. The interferometric modulator array 200 includes a black mask structure 23, and a mechanical layer that includes a mirror layer 121, a dielectric layer 122, and a cap layer 123. Although not illustrated in FIG. 14 for clarity, the interferometric modulator array 110 includes other structures. For example, an optical stack can be disposed over the black mask structure 23, and the optical stack and the mirror layer 121 can be separated by an air gap that operates as an interferometric cavity. The optical stack can include a stationary electrode that can be electrically connected to the black mask structure 23 to form row electrodes of the array.

As shown in FIG. 14 the black mask structure 23 is disposed at each corner of the pixels of the interferometric modulator array 200 and along a portion of each side of a pixel to absorb light between pixels. The thickness of the black mask structure 23 can create a topology that can impact layers deposited conformally over the black mask structure, including for example, the layers that are used to form the mechanical layer.

To aid in reducing the topological impacts of the black mask structure 23, the dielectric layer 122 of the mechanical layer has been patterned to have no overlap with the black mask structure 23. For example, the dielectric layer 122 of each pixel has been spaced from the black mask layer 23 by a distance $d_5$. The distance $d_5$ can be any suitable distance, and in some implementations is selected to be in the range of about 0 μm to about 5 μm. By configuring the dielectric layer 122 in this manner, overlap of the dielectric layer 122 and the black mask structure 23 is avoided and mechanical layer flatness can be improved.

As shown in FIG. 14, the mirror and cap layers 121, 123 can extend across the array 200 in one direction so as to operate as column electrodes in the array. The mirror and cap layers 121, 123 can electrically connect to each other in portions of the mechanical layer in which the dielectric layer 122 is not included. The illustrated column electrodes formed from the mirror and cap layers 121, 123 can have a relatively small RC delay, and thus the electrical potential of the illustrated column electrodes can be varied at relatively high frequencies associated with high frame rate displays. The mirror and cap layers 121, 123 also can aid in supporting the mechanical layer. For example, support structures can be disposed at pixel corners and the mirror and cap layers 121, 123 can contact the support structures at the pixel corners to support the mechanical layer over the interferometric gap. Although the illustrated array 200 of FIG. 14 shows an implementation in which the mirror and cap layers 121, 123 are configured to electrically contact each in other in portions of the mechanical layer in which the dielectric layer 122 is not included in the mechanical layer, the mirror and cap layer 121, 123 need not electrically contact each other in these regions. For example, a configuration similar to that shown in FIG. 12B can be employed.

Figure 15A:
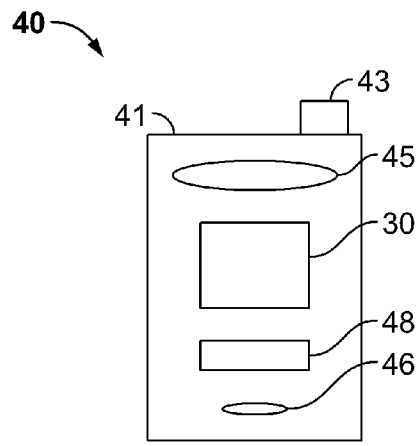
FIGS. 15A and 15B show examples of system block diagrams illustrating a display device that includes a plurality of interferometric modulators.
Figure 15B:
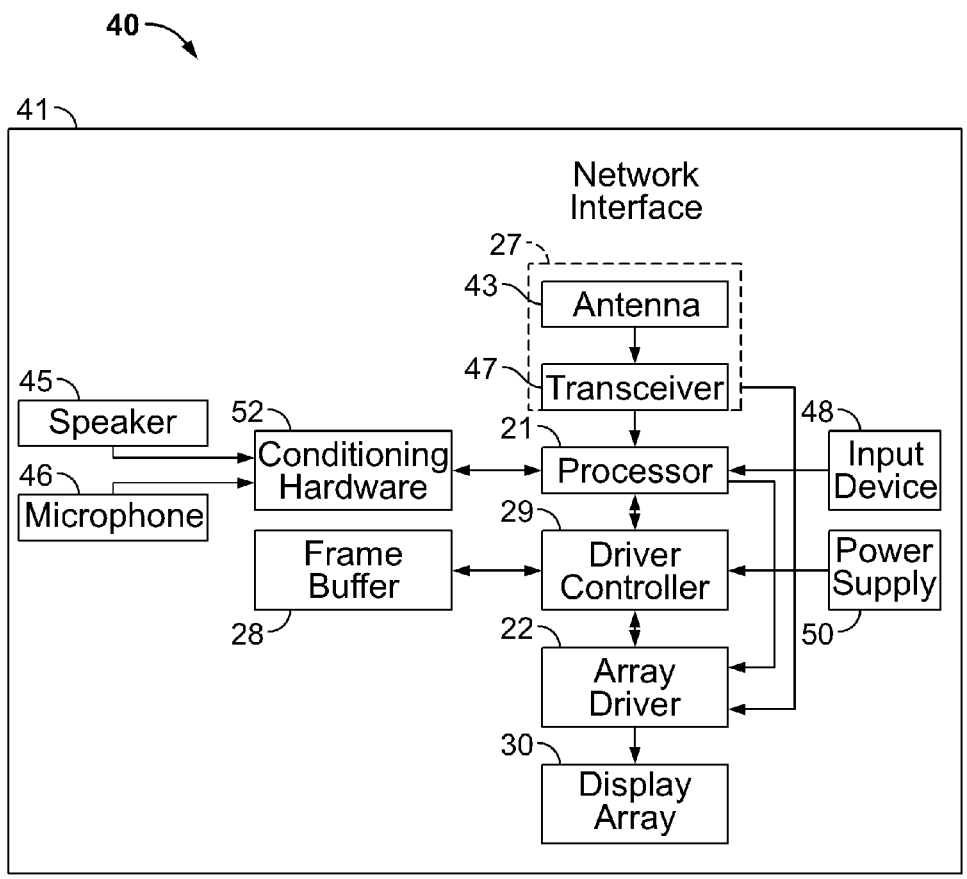

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
    a substrate; and
    a plurality of pixels arranged in an array on the substrate, each pixel including a black mask disposed on the substrate along at least a portion of a side of each pixel, an optical stack disposed over the substrate and over at least a portion of the black mask, a mechanical layer disposed over the optical stack, the mechanical layer including a reflective layer, a cap layer, and a dielectric layer, the dielectric layer disposed between the reflective layer and the cap layer, a cavity between the mechanical layer and the optical stack, the mechanical layer movable through the cavity between an actuated position and a relaxed position, wherein the mechanical layer includes a notch in the dielectric layer along the side of each pixel, the notch reducing the overlap of the dielectric layer with the black mask along the side of the pixel.

2. The apparatus of claim 1, wherein the reflective layer and the cap layer extend past a portion of the dielectric layer and electrically contact each other in at least a portion of the notch.

3. The apparatus of claim 1, wherein the notch in the mechanical layer extends through each of the reflective layer, the dielectric layer, and the cap layer along the side of each pixel.

4. The apparatus of claim 1, wherein the reflective layer and the cap layer each include aluminum-copper (AlCu).

5. The apparatus of claim 4, wherein the dielectric layer includes silicon oxynitride (SiON).

6. The apparatus of claim 1, wherein the notch has a length dimension extending along the side of the pixel of between about 2 μm and about 30 μm.

7. The apparatus of claim 1, wherein the notch has a width dimension extending from an edge of the mechanical layer into the mechanical layer of between about 0.5 μm and about 5 μm.

8. The apparatus of claim 1, wherein each pixel includes a plurality of sides and the black mask is disposed along at least a portion of each side, and wherein the mechanical layer includes a notch in the dielectric layer along each side of each of the plurality of pixels.

9. The apparatus of claim 1, further comprising a stationary electrode positioned between the substrate and the cavity.

10. The apparatus of claim 9, further comprising:
a display;
a processor that is configured to communicate with the display, the processor being configured to process image data; and
a memory device that is configured to communicate with the processor.

11. The apparatus of claim 10, further comprising a driver circuit configured to send at least one signal to the display.

12. The apparatus of claim 11, further comprising a controller configured to send at least a portion of the image data to the driver circuit.

13. The apparatus of claim 12, further comprising an image source module configured to send the image data to the processor.

14. A method of forming an electromechanical device having a plurality of pixels, the method comprising:
depositing a black mask on a substrate, the black mask disposed along at least a portion of a side of each pixel;
depositing an optical stack over the substrate and over at least a portion of the black mask;
forming a mechanical layer over the optical stack, wherein forming the mechanical layer includes providing a reflective layer, a dielectric layer over the reflective layer, and a cap layer over the supporting layer;

forming a cavity between the mechanical layer and the optical stack, the mechanical layer movable through the cavity between an actuated position and a relaxed position, and forming a notch in the dielectric layer of the mechanical layer along the side of each pixel, the notch reducing the overlap of the dielectric layer with the black mask along the side of the pixel.

15. The method of claim 14, further comprising depositing a sacrificial layer before forming the mechanical layer and removing the sacrificial layer after depositing the mechanical layer to form the cavity of the pixel, wherein the sacrificial layer has a thickness selected to define a height of the cavity.

16. The method of claim 15, further comprising forming a hole in the sacrificial layer and depositing a support post in the hole before depositing the mechanical layer.

17. The method of claim 14, further comprising forming a notch in the cap and reflective layers of the mechanical layer along the side of each pixel.

18. The method of claim 14, wherein the reflective layer and the cap layer are formed to extend past a portion of the dielectric layer and electrically contact each other in at least a portion of the notch.

19. The method of claim 14, wherein the reflective layer and the cap layer each include aluminum-copper (AlCu).

20. The method of claim 19, wherein the dielectric layer includes silicon oxynitride (SiON).

21. The method of claim 14, wherein the notch has a length dimension extending along the side of the pixel of between about 2 μm and about 30 μm.

22. The method of claim 14, wherein the notch has a width dimension extending into the mechanical layer of the pixel of between about 0.5 μm and about 5 μm.

23. The method of claim 14, wherein each pixel includes a plurality of sides and the black mask is deposited along at least a portion of each side of each of the plurality of pixels.

24. The method of claim 23, further comprising forming a notch in the dielectric layer of the mechanical layer along each side of the pixel.

25. An apparatus, comprising:
a substrate; and
a plurality of pixels arranged in an array on the substrate, each pixel including
a means for absorbing light on the substrate, the light absorbing means including a portion disposed along a side of each pixel,
an optical stack disposed over the substrate and over at least a portion of the light absorbing means,
a mechanical layer disposed over the optical stack, the mechanical layer including a reflective layer, a dielectric layer, and a cap layer, the dielectric layer disposed between the reflective layer and the cap layer,
a cavity between the mechanical layer and the optical stack, the mechanical layer movable through the cavity between an actuated position and a relaxed position,
wherein the mechanical layer further includes a means for reducing overlap along the side of each pixel, the overlap reducing means reducing the overlap of the dielectric layer with the light absorbing means along the side of the pixel.

26. The apparatus of claim 25, wherein the overlap reducing means includes a notch in the dielectric layer of the mechanical layer along the side of each pixel, the notch being dimensioned so as to reduce the overlap of the dielectric layer with the light absorbing means along the side of each pixel.

27. The apparatus of claim 25, wherein the light absorbing means includes a black mask.

28. The apparatus of claim 25, wherein the reflective layer and the cap layer extend past the dielectric layer and electrically contact each other in at least a portion of the overlap reducing means.

29. The apparatus of claim 25, wherein the overlap reducing means is further configured to reduce the overlap of the reflective and cap layers with the light absorbing means.

30. The apparatus of claim 25, wherein the reflective layer and the cap layer comprise aluminum-copper (AlCu).

31. The apparatus of claim 25, wherein the dielectric layer comprises silicon oxynitride (SiON).

* * * * *